(12) United States Patent
Ito et al.

(10) Patent No.: US 9,624,978 B2
(45) Date of Patent: Apr. 18, 2017

(54) BEARING DEVICE

(75) Inventors: Hiroyoshi Ito, Kuwana (JP); Kaoru Oomoto, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/344,479

(22) PCT Filed: Sep. 6, 2012

(86) PCT No.: PCT/JP2012/072716
§ 371 (c)(1),
(2), (4) Date: Mar. 12, 2014

(87) PCT Pub. No.: WO2013/038982
PCT Pub. Date: Mar. 21, 2013

(65) Prior Publication Data
US 2014/0341490 A1 Nov. 20, 2014

(30) Foreign Application Priority Data

Sep. 13, 2011 (JP) .................................. 2011-199021
Oct. 12, 2011 (JP) .................................. 2011-225165
(Continued)

(51) Int. Cl.
*F16C 33/66* (2006.01)
*F16C 19/16* (2006.01)
*F16C 41/00* (2006.01)

(52) U.S. Cl.
CPC ........ *F16C 33/6659* (2013.01); *F16C 33/664* (2013.01); *F16C 33/6607* (2013.01);
(Continued)

(58) Field of Classification Search
CPC F16C 33/6607; F16C 33/6625; F16C 33/664; F16C 33/6659; F16C 2300/02;
(Continued)

(56) References Cited

U.S. PATENT DOCUMENTS 912,740 A   2/1909 Schrode
1,961,514 A   6/1934 Ernst et al.
(Continued)

FOREIGN PATENT DOCUMENTS

CN    1688827    10/2005
CN    101107454    1/2008
(Continued)

OTHER PUBLICATIONS

Machine Translation of JP2010-078114 dated Apr. 8, 2010.*
(Continued)

*Primary Examiner* — Alan B Waits
(74) *Attorney, Agent, or Firm* — Wenderoth, Lind & Ponack, L.L.P.

(57) ABSTRACT

A bearing device is constituted by a rolling bearing and a lubricant supply device combined with each other. The lubricant supply device includes a lubrication oil tank which stores pressurized lubrication oil and has a lubrication oil discharge spout; an open/close valve which opens/closes the lubrication oil discharge spout of the lubrication oil tank; a driving section which operates the open/close valve; and an electric power source section which generates electric energy for operation of the driving section. The lubricant supply device is attached to the rolling bearing or to a spacer adjacent thereto.

8 Claims, 22 Drawing Sheets

(30) Foreign Application Priority Data

Aug. 1, 2012 (JP) ................................ 2012-171139
Aug. 20, 2012 (JP) ................................ 2012-181556

(52) U.S. Cl.
CPC ...... *F16C 33/6625* (2013.01); *F16C 33/6674* (2013.01); *F16C 41/004* (2013.01); *F16C 19/163* (2013.01); *F16C 2300/02* (2013.01)

(58) Field of Classification Search
CPC .. F16C 33/6674; F16C 41/004; F16C 19/163; F16N 7/14
See application file for complete search history.

(56) References Cited

U.S. PATENT DOCUMENTS

| | | | | |
|---|---|---|---|---|
| 3,206,261 | A * | 9/1965 | Schaefer | 384/471 |
| 5,666,146 | A * | 9/1997 | Mochizuki et al. | 347/86 |
| 6,053,606 | A * | 4/2000 | Yamaguchi et al. | 347/86 |
| 6,838,794 | B2 * | 1/2005 | Iwamoto et al. | 310/90 |
| 7,654,375 | B2 * | 2/2010 | Okada et al. | 192/35 |
| 8,523,338 | B2 * | 9/2013 | Kambe | 347/86 |
| 2005/0141796 | A1 * | 6/2005 | Katsuzawa et al. | 384/473 |
| 2006/0165328 | A1 * | 7/2006 | Ueno et al. | 384/462 |
| 2008/0112661 | A1 | 5/2008 | Suzuki et al. | |
| 2008/0121465 | A1 | 5/2008 | Suzuki et al. | |
| 2008/0198187 | A1 * | 8/2008 | Aoki et al. | 347/7 |
| 2009/0116776 | A1 * | 5/2009 | Ito | F16C 19/26 384/448 |
| 2009/0148087 | A1 * | 6/2009 | Suzuki et al. | 384/462 |
| 2009/0180723 | A1 * | 7/2009 | Nakamura | 384/473 |
| 2011/0182735 | A1 * | 7/2011 | Kodama | F03D 7/0224 416/155 |
| 2012/0301065 | A1 * | 11/2012 | Mori et al. | 384/469 |
| 2014/0248015 | A1 * | 9/2014 | Yamamoto et al. | 384/471 |

FOREIGN PATENT DOCUMENTS

| | | |
|---|---|---|
| EP | 0 256 565 | 2/1988 |
| JP | 50-138192 | 11/1975 |
| JP | 9-100838 | 4/1997 |
| JP | 11-190270 | 7/1999 |
| JP | 2004-108388 | 4/2004 |
| JP | 2004-316707 | 11/2004 |
| JP | 2006-125540 | 5/2006 |
| JP | 2006-194402 | 7/2006 |
| JP | 2007-92886 | 4/2007 |
| JP | 2007-138963 | 6/2007 |
| JP | 2007-270856 | 10/2007 |
| JP | 2008-14465 | 1/2008 |
| JP | 2008-106900 | 5/2008 |
| JP | 2009-168139 | 7/2009 |
| JP | 2010-78114 | 4/2010 |
| JP | 2010-270769 | 12/2010 |
| JP | 2012-102803 | 5/2012 |

OTHER PUBLICATIONS

Partial Supplementary European Search Report issued Apr. 13, 2015 in corresponding European Application No. 12832095.9.
International Preliminary Report on Patentability and Written Opinion of the International Searching Authority issued Mar. 27, 2014 in International (PCT) Application No. PCT/JP2012/072716.
International Search Report issued Nov. 27, 2012 in International (PCT) Application No. PCT/JP2012/072716.
Notification of First Office Action issued Aug. 24, 2015 in corresponding Chinese Application No. 201280044468.X (with partial English translation).
Notification of Reason(s) for Refusal issued Mar. 8, 2016 in corresponding Japanese Application No. 2012-171139 (with English translation).
Notification of Reason(s) for Refusal issued Mar. 8, 2016 in corresponding Japanese Application No. 2012-181556 (with English translation).
Japanese Office Action issued Aug. 30, 2016 in corresponding Japanese Patent Application No. 2012-171139 (with English translation).
Japanese Office Action issued Sep. 13, 2016 in corresponding Japanese Patent Application No. 2012-181556 (with English translation).

* cited by examiner

BEARING DEVICE

BACKGROUND OF INVENTION

Technical Field

The present invention relates to bearing devices used in machine tools, industrial machinery, etc., and particularly to a bearing device constituted as a combination of a bearing and an oil supply unit.

Background Art

A bearing device which incorporates an oil supply unit therein is conventional (see Patent Literature 1). This bearing device is a rolling bearing and an oil supply unit is mounted on an inner diameter surface of one of two mutually opposed track rings, or a fixed-side track ring in this case. The oil supply unit includes a tank which stores lubrication oil; a pump which pumps out the lubrication oil stored in the tank into the bearing; and an electric generator which drives the pump. The device also includes means which controls the pump based on bearing conditions thereby controlling an amount of discharged oil. Patent Literature 2 shows another bearing device which includes a similar oil supply unit.

Patent Literature 3 shows a rolling bearing device, in which a lubrication oil tank of the oil supply unit is detachable/attachable and is mounted between a fixed-side track ring and a rotation-side track ring. The oil supply unit has a casing which serves as the lubrication oil tank.

All of these conventional examples described above have a shared arrangement that the lubricant is supplied to the bearing by a pump which is a constituent component of the oil supply unit.

CITATION LIST

Patent Literature

Patent Literature 1: JP-A-2004-108388
Patent Literature 2: JP-A-2004-316707
Patent Literature 3: JP-A-2008-106900

TECHNICAL PROBLEM

The oil supply unit which makes use of a pump has the following problems: First, there is a lead time before the pump attains a pressure capable of discharging the oil, after the pump is started. In addition, each individual pump has a different capacity for supplying lubrication oil, and therefore individual adjustment is necessary. Further, electric energy is converted into mechanical, rotary energy in order to drive the pump. This means energy efficiency is low.

SUMMARY OF INVENTION

Therefore, a first object of the present invention is to provide a rolling bearing device which includes an oil supply unit capable of supplying the lubrication oil from a lubrication oil tank to the rolling bearing without utilizing a pump, without a time lag, and at a high level of energy efficiency.

Next, rolling bearing devices which include conventional oil supply units have such a construction that the oil supply unit is assembled into a space between a fixed-side track ring and a rotation-side track ring of the rolling bearing, and for this reason the fixed-side track ring and the rotation-side track ring must be of a special width and shape, i.e., standard track rings are not usable. This leads to management complication in manufacturing the rolling bearings, resulting in increased cost.

Also, when replenishing lubrication oil to the lubrication oil tank in the oil supply unit, the entire rolling bearing must be removed from, e.g., a spindle housing of a machine tool. Further, since the casing of the oil supply unit also serves as the lubrication oil tank, the oil supply unit must be removed from the rolling bearing after the rolling bearing was removed, in order for the lubrication oil to be added. In other words, replenishing the lubrication oil requires many steps and is time consuming.

In addition, since the casing of the oil supply unit also serves as the lubrication oil tank, there has been no such option as having a replacement lubrication oil tank ready in advance.

Therefore, a second object of the present invention is to provide a rolling bearing device which does not require a special fixed-side track ring nor a special rotation-side track ring of special width and shape, and does not require removal of the rolling bearing when replenishing the lubrication oil tank with lubrication oil.

Next, in rolling bearing devices which include conventional oil supply units, the pump sucks up the lubrication oil from the lubrication oil tank and discharges the oil through a pump discharge piping, into the bearing. The amount of oil supply is controlled by the pump operation time.

However, when the pump is stopped after completing the lubrication oil supply, the pump and the discharge piping are filled with lubrication oil, and there is siphoning of lubrication oil from the lubrication oil tank into the discharge piping. The lubrication oil leaks out of the nozzle, causing oversupply of lubrication oil, resulting in increased stirring resistance of the lubrication oil.

As a result, it is impossible to obtain a stable lubrication environment, and there is additional problem of heat generation.

Therefore, a third object of the present invention is to provide a rolling bearing device which is capable of performing appropriate supply of lubrication oil from the lubrication oil tank of the oil supply unit.

SOLUTION TO PROBLEM

In order to achieve the first object, the present invention provides a bearing device comprising a rolling bearing and a lubricant supply device combined with each other, in which the lubricant supply device includes: a lubrication oil tank which stores pressurized lubrication oil and has a lubrication oil discharge spout; an open/close valve which opens/closes the discharge spout of the lubrication oil tank; a driving section which operates the open/close valve; and an electric power source section which generates electric energy for operation of the driving section. With this, the lubricant supply device is attached to the rolling bearing or to a spacer adjacent thereto.

The lubrication oil loaded in the lubrication oil tank is pressurized by a pressurizer which presses the oil with a pressurizing spring.

Alternatively, lubrication oil is discharged from a nozzle of the open/close valve by a pressure from a weight of lubricant which is stored in the lubrication oil tank.

Next, in order to achieve the second object, the present invention provides a bearing device comprising a rolling bearing and a lubricant supply device combined with each other, in which the lubricant supply device is attached to a spacer adjacent to the rolling bearing, and at least includes an lubrication oil tank which has a lubrication oil discharge spout, a pump, a driving section, and an electric power source section. With the above, the lubrication oil tank is provided by an elastic bag.

The bag which constitutes the lubrication oil tank is made of a resin film, by placing a sheet of the resin film on another and thermally welding perimeters.

Next, in order to achieve the third object, the present invention provides a bearing device comprising a rolling bearing and a lubricant supply device combined with each other, in which the lubricant supply device includes at least a lubrication oil tank; a pump which sucks lubrication oil from the lubrication oil tank and discharges the lubrication oil from a discharge spout; a driving section which operates the pump; an electric power source section which supplies the driving section with electric energy; and a leakage prevention mechanism which is disposed at a discharge piping of the pump for preventing leakage of lubrication oil. With the above, the lubricant supply device is attached to a fixed-ring-side member of the rolling bearing or to a spacer adjacent to the rolling bearing.

Examples of the leakage prevention mechanism include an open/close valve provided in the discharge piping of the pump arranged in such a fashion that the open/close valve will be opened only during oil supply operation. Another example is an arrangement that upon completion of oil supply by operating the pump, the pump is operated in reverse thereby introducing air into the discharge piping.

ADVANTAGEOUS EFFECTS OF INVENTION

According to the present invention which achieves the first object, unlike those which use a pump in supplying lubrication oil, there is no time lag before lubrication oil supply because lubrication oil supply is made by the open/close valve which opens/closes the discharge spout of the lubrication oil tank which stores pressurized lubrication oil.

Also, energy efficiency is improved over those which use pumps because lubricant supply is achieved by opening/closing the open/close valve.

According to the present invention which achieves the second object, there is no need for utilizing a special fixed-side track ring nor a special rotation-side track ring of special width and shape. Further, it is possible to replenish the lubrication oil tank with lubrication oil without removing the rolling bearing.

According to the present invention which achieves the third object, the bearing device is capable of preventing the problem that lubrication oil inside the pump and discharge piping is siphoned into the discharge piping, causing leakage of the lubrication oil from the nozzle end, resulting in oversupply of lubrication oil when the pump is stopped after completion of lubrication oil supply.

DESCRIPTION OF EMBODIMENTS

Hereinafter, embodiments of the present invention will be described based on the attached drawings. In the following description of embodiments, parts and components having the same construction will be indicated by the same alphanumerical reference symbols, without repeating description thereof when appropriate, to avoid redundancy.

[Embodiment 1]

Figure 1:
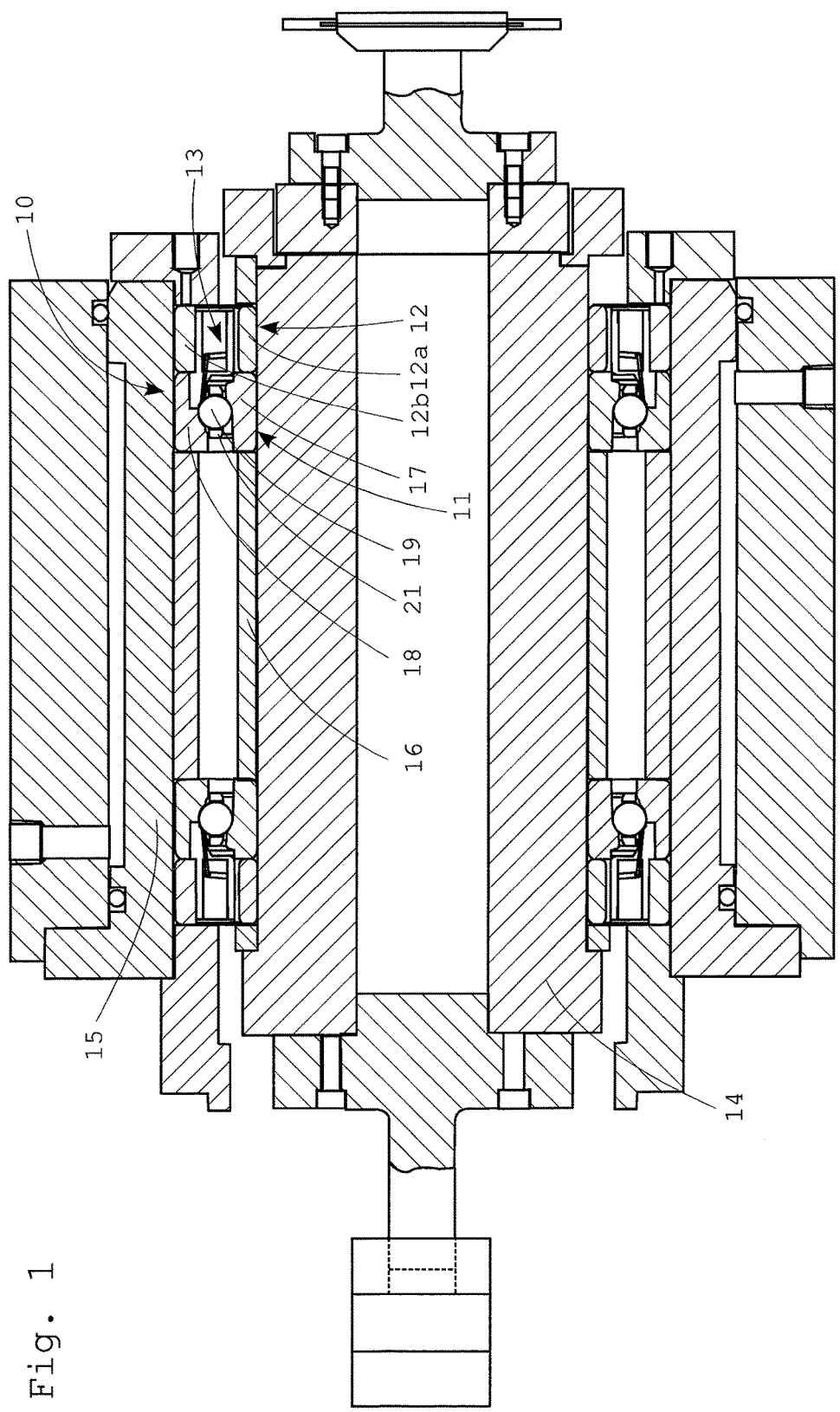
FIG. 1 is a sectional view showing an embodiment of a rolling bearing device used in a machine tool, as a solution to the first object of the present invention.

A rolling bearing device 10 embodies a solution to the first object of the present invention; namely, this bearing device includes an oil supply unit 13 which is capable of supplying lubrication oil A from a lubrication oil tank 39 to a rolling bearing 11 without time lag and without using a pump, and at a high level of energy efficiency. This embodiment, i.e., the rolling bearing device 10 will now be described with reference to FIG. 1 through FIG. 4. FIG. 1 shows a machine tool which incorporates the rolling bearing devices 10.

The bearing device 10 according to the embodiment shown in FIG. 1 through FIG. 4 includes a rolling bearing 11; a spacer 12 press-contacted onto an axial end of the rolling bearing; and an oil supply unit 13 incorporated in the spacer 12; and when used, is assembled into a space between a rotation shaft 14 and a housing 15. The rolling bearing 11 has another end, on which another spacer 16 is press-contacted. These two spacers 12, 16 provide axial positioning of the rolling bearing 11. The rotation shaft 14 is placed horizontally. In cases where the rotation shaft 14 is horizontal, the bearing device 10 is called upright type.

The rolling bearing 11 includes track rings provided by an inner ring 17 and an outer ring 18; a predetermined number of rolling elements 19 placed between the track rings; and a retainer 21 which keeps a predetermined distance between the rolling elements 19. The rolling bearing 11 is an angular contact ball bearing. In the figures, the outer ring 18 serves as a fixed-side track ring.

The spacer 12 includes an inner-ring-side spacer 12a and an outer-ring-side spacer 12b. The inner-ring-side spacer 12a is fitted in and fixed to the rotation shaft 14 side and is press-contacted onto an end of the inner ring 17. The outer-ring-side spacer 12b is fitted in and fixed to an inner diameter surface of the housing 15, and is press-contacted onto an end of the outer ring 18. In the same fashion, the other spacer 16 is fitted in and fixed to the rotation shaft 14 side and the housing 15 side, and is press-contacted onto the other ends of the inner ring 17 and of the outer ring 18. Thus, the rolling bearing 11 is preloaded at a predetermined pressure.

The oil supply unit 13 is constituted by an annular, plastic casing 24 which is mounted on an inner diameter surface of the outer-ring-side spacer 12b, and various members incorporated inside the casing. The oil supply unit 13 is mounted on an inner diameter surface of the outer ring 18 if the outer ring 18 is wide in its width. In this case, the spacer 12 serves only as a spacer. As shown in the figures, in the present embodiment, the oil supply unit 13 is mounted to the spacer 12.

Figure 3:
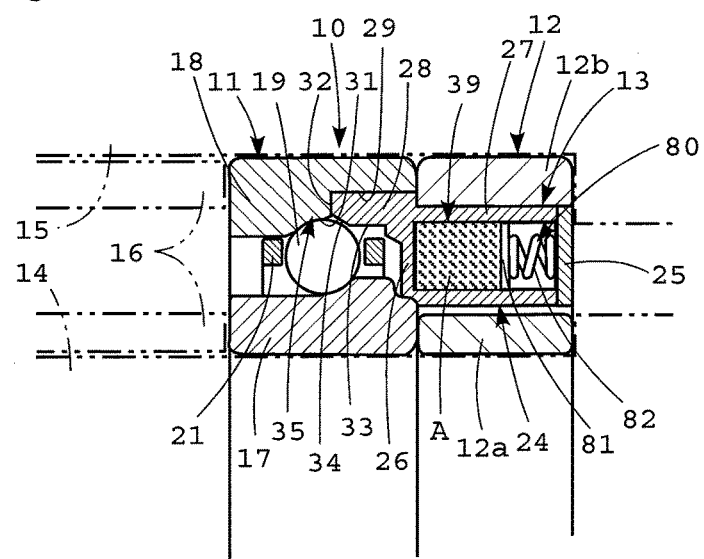
FIG. 3 is a sectional view taken in lines b-o in FIG. 2.
Figure 4:
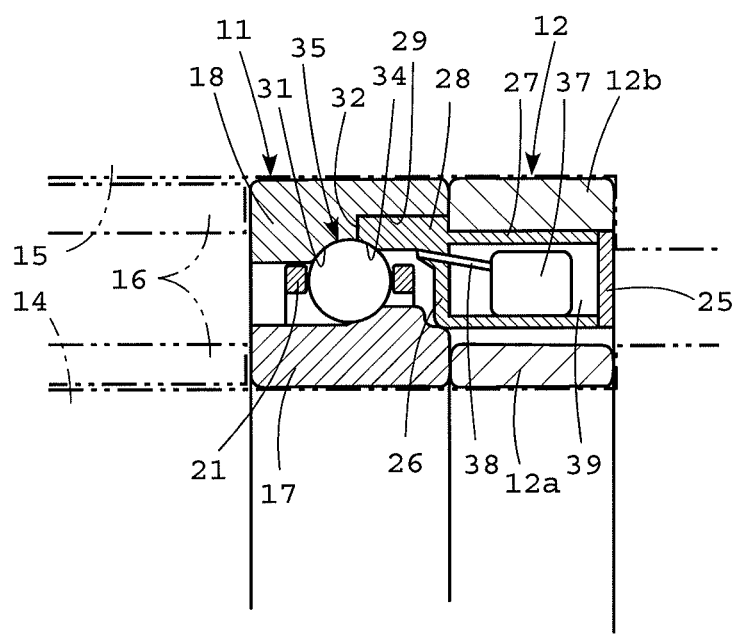
FIG. 4 is a sectional view taken in lines c-c' in FIG. 2.
Figure 5:
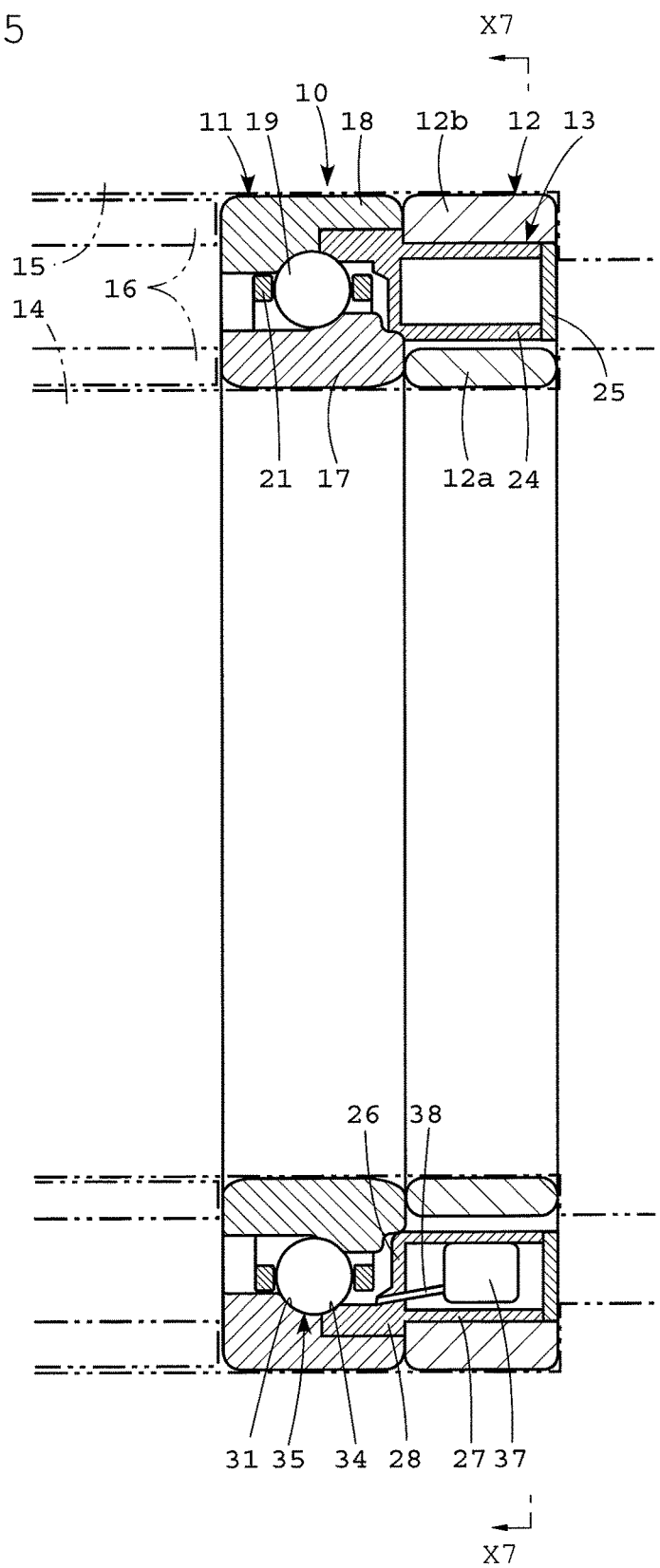
FIG. 5 is a sectional view showing another embodiment of a rolling bearing device as a solution to the first object of the present invention.

As shown in FIG. 3 and FIG. 4, the casing 24 has a U-shaped section, with an open end facing away from the rolling bearing 11, and to this open end, an annular lid 25 is attached detachably therefrom/attachably thereto. On a side away from this open end side, along a corner region made by an inner end surface 26 and an outer circumferential surface 27 of the casing 24, an outward protruding guide 28 is provided all around the circumference. The guide 28 is assembled into a stepped portion 29 which is at a shoulder region in an inner diameter surface of the outer ring 18 of the rolling bearing 11. The outer ring 18 has a partial track groove 31 as a cutout made by the stepped portion 29.

Figure 2:
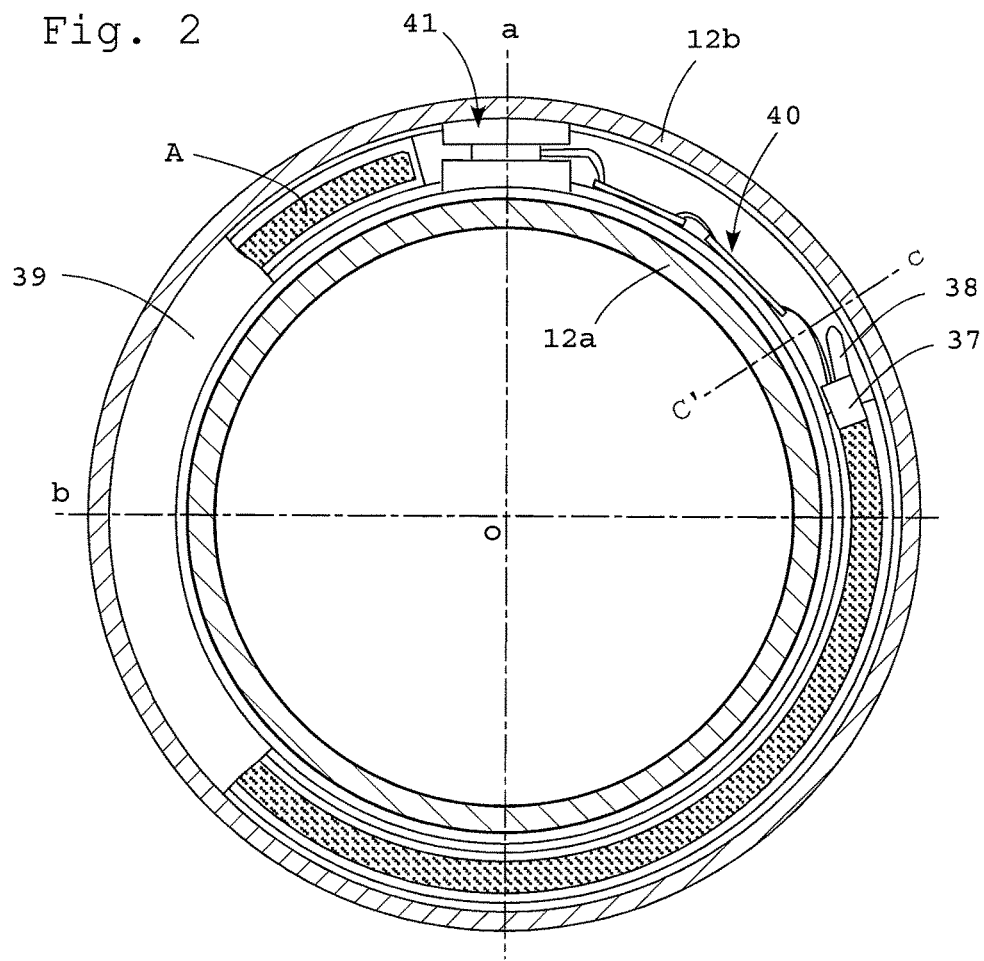
FIG. 2 is an axial sectional view showing an oil supply unit of a rolling bearing device according to the present invention.

The spacer 12 which is provided with the oil supply unit 13 is left-right symmetric. FIG. 2 is a view when the spacer 12 on the right side in FIG. 1 is viewed from an axial direction.

Along an inner circumferential surface of the fixed-side outer-ring-side spacer 12b in the spacer 12, a lubrication oil tank 39 which stores lubrication oil A is provided.

The lubrication oil tank 39 has a discharge nozzle 38 via an open/close valve 37. The lubrication oil tank 39 has a pressurizer 80 for pressurizing the lubrication oil A. When the open/close valve 37 is opened, a pressurizing force from the pressurizer 80 causes the lubrication oil A from inside the lubrication oil tank 39 to be discharged from the discharge nozzle 38, and when the open/close valve 37 is closed, the discharge of the lubrication oil A stops.

For example, the pressurizer 80 may be provided by a type shown in FIG. 3, in which lubrication oil A loaded in the lubrication oil tank 39 is pressed by a pressurizing spring 82 via a pressurizing seal plate 81.

Lubrication oil A discharged from the lubrication oil tank 39 has a discharge pressure which is determined by the pressure exerted by the pressurizer 80 to the lubrication oil tank 39 if the nozzle size of the discharge nozzle 38 is constant. Therefore, by controlling the pressure of the pressurizer 80 in accordance with the type of lubrication oil A, it is possible to send the lubrication oil A from the lubrication oil tank 39 at a constant pressure.

The discharge nozzle 38 is inserted into an inner circumferential surface of the fixed-ring-side outer ring 18 of the rolling bearing 11, and supplies the lubrication oil A discharged from the discharge nozzle 38 to surfaces of the balls 19 or to the track groove 35.

The discharge nozzle 38 may be a spray nozzle which sprays lubrication oil A in an atomized form. Since this decreases stirring resistance caused by lubrication oil A, it is possible to reduce heat generation in the rolling bearing 11.

The amount of lubrication oil A discharged from the discharge nozzle 38 can also be controlled by changing valve opening degree in the open/close valve 37.

Next, FIG. 5 through FIG. 8 show an embodiment, which is the same rolling bearing device 10 as the embodiment shown in FIG. 1 through FIG. 4 in that it is capable of supplying lubrication oil A from a lubrication oil tank 39 to a rolling bearing 11 without time lag and without a pump; however, in this present embodiment, discharge pressure of lubrication oil A is not created by the pressurizer 80, but lubrication oil A is guided to the open/close valve 37 by the weight of the lubrication oil A.

Figure 6:
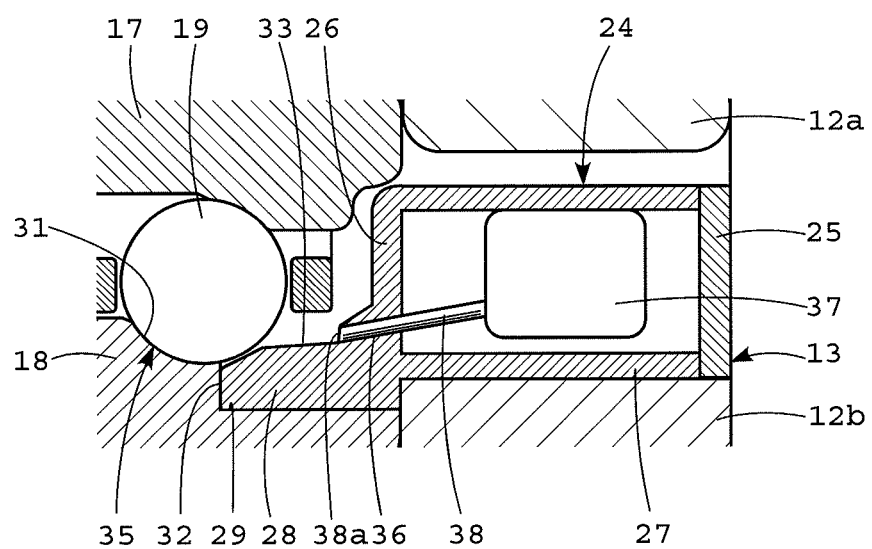
FIG. 6 is an enlarged sectional view of a portion taken from FIG. 5.

As shown in FIG. 6, a discharge hole 36 is formed at a border region between an inner diameter surface 33 and the inner end surface 26 of the guide 28. When the casing 24 is assembled into the inner diameter surface of the outer ring-side spacer 12b, the casing 24 is positioned so that this discharge hole 36 will be at the lowest position during operation. The casing 24 is made of plastic or metal.

Figure 7:
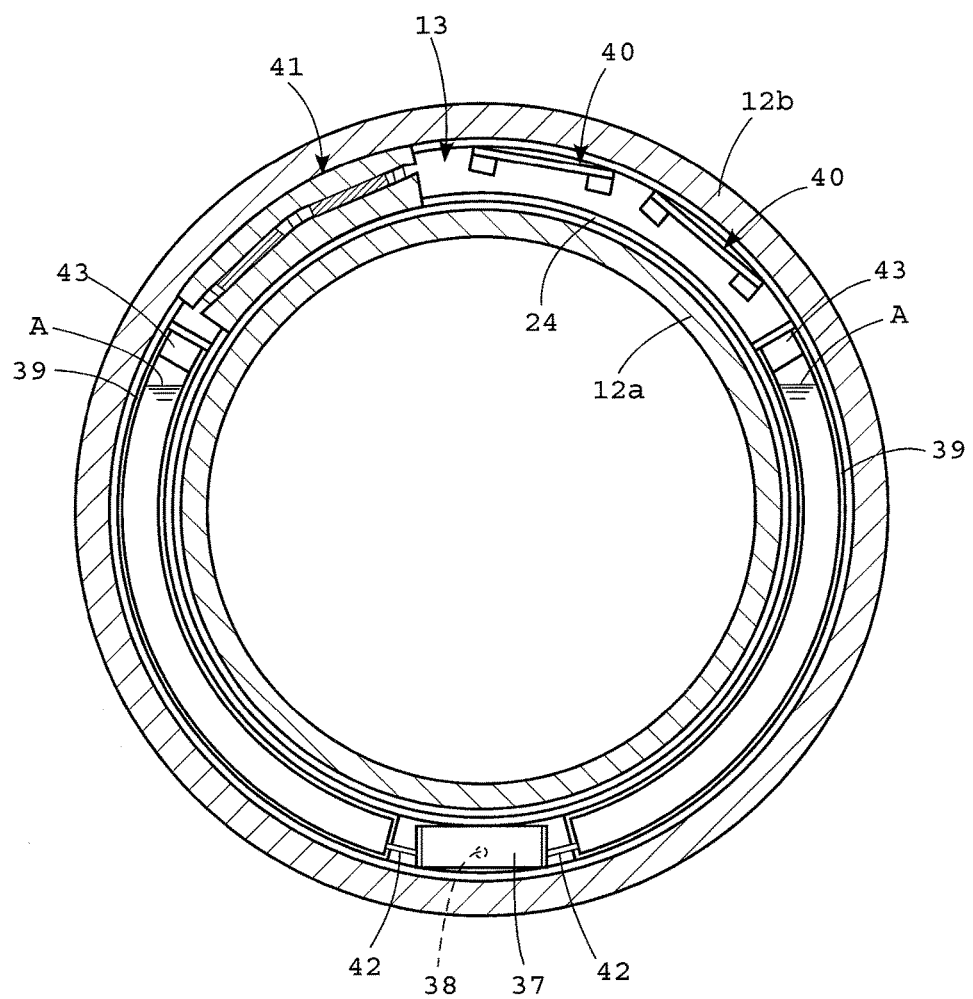
FIG. 7 is a sectional view taken in lines X7-X7 in FIG. 5.
Figure 8:
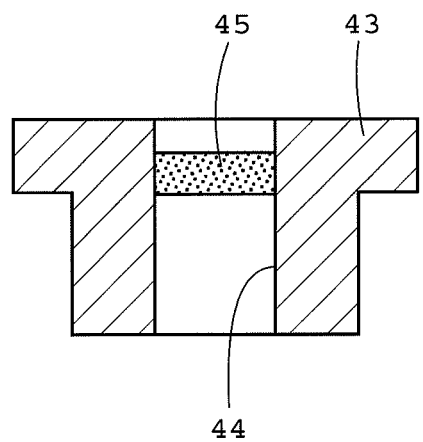
FIG. 8 is an enlarged sectional view of a stop plug in the embodiment in FIG. 5.

The casing 24 incorporates therein various parts and components of the oil supply unit 13 as shown in FIG. 7, including an open/close valve 37 which is provided by a normally closed solenoid valve; a pair of left and right tanks 39; and an electric power source section 41 of a driving section 40.

The open/close valve 37 is placed at a position which represents the lowest position during the use, i.e., a region including the discharge hole 36. The open/close valve 37 has a nozzle 38 at its low position. The nozzle 38 is inserted obliquely through the discharge hole 36 so that the nozzle 38 has its discharge spout 38a facing down (see FIG. 5 and FIG.

6). The discharge spout 38a consequently reaches a point which is close to the track groove 35 in the inner diameter surface of the guide 28.

The pair of lubrication oil tanks 39 are housed detachably/attachably on both sides of the open/close valve 37, at positions higher than the nozzle 38. Each tank 39 has its lower end connected to the open/close valve 37 via a connection pipe 42. The open/close valve 37 and the tanks 39 may be integrated with each other, in which case, the connection pipes 42 are not needed.

Each tank 39 has an opening in its upper end, to which a stop plug 43 is fitted. The stop plug 43 is removed when loading the tank 39 with lubrication oil. During normal operation, the opening is closed to prevent lubrication oil leakage. However, if these openings are closed completely, a partial vacuum will be developed inside the tanks 39 and inhibit discharge of lubrication oil. Thus, an air vent 44 (see FIG. 8) is formed, and to this air vent 44, a filter 45, which allows air to pass through but does not allow lubrication oil, is attached. The filter 45 is made of a porous-continuous resin material, for example.

In the embodiment shown in FIG. 1 through FIG. 4 and in the embodiment shown in FIG. 5 through FIG. 8, the open/close valve 37 is opened/closed by the driving section 40, the driving section 40 is operated by the electric power source section 41, and these two components are disposed between the outer ring-side spacer 12b and the inner ring-side spacer 12a of the spacer 12, like the lubrication oil tank 39.

In the embodiment shown in FIG. 5 through FIG. 8, the driving section 40 and the electric power source section 41 are disposed between upper ends of the tanks 39. Power supply between the driving section 40 and the electric power source section 41, and between the driving section 40 and the open/close valve 37 is provided via cables (not illustrated) routed inside the casing 24.

Figure 9:
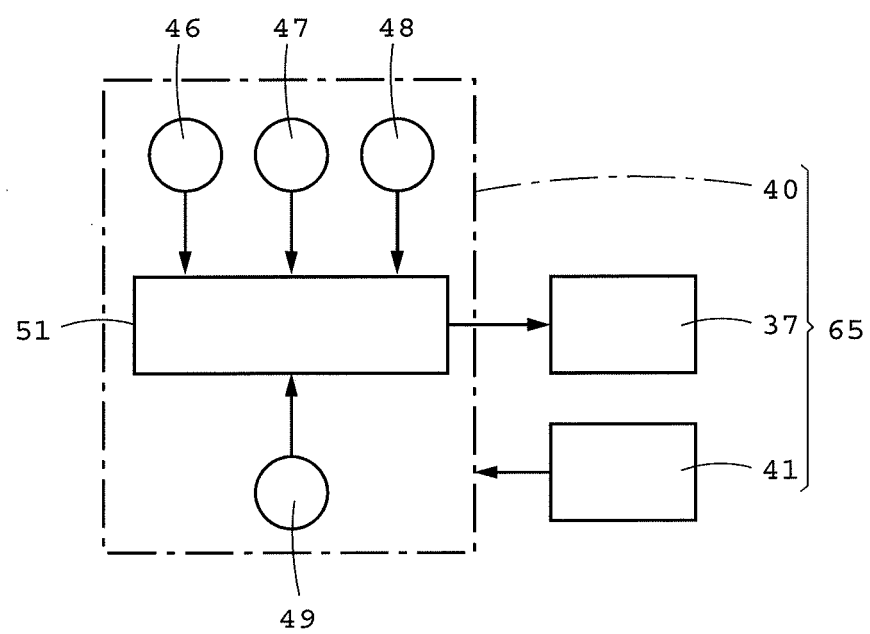
FIG. 9 is a block diagram of a supply amount controller in the embodiment in FIG. 5.

As shown in FIG. 9, the driving section 40 has sensors such as a bearing temperature sensor 46, a bearing rotation sensor 47, a lubricant remaining quantity sensor 48, and a lubricant temperature sensor 49. Signals from these sensors are inputted to a CPU 51, which then automatically controls the open/close valve 37 in terms of degree of opening and time for which the valve is opened, in accordance with temperature and rotation status of the rolling bearing 11, thereby controlling the amount of lubricant supply.

The open/close valve 37, the driving section 40 and the electric power source section 41 constitute a discharge amount adjuster 65 for the lubricant discharged from the open/close valve 37 (see FIG. 9).

Figure 10:
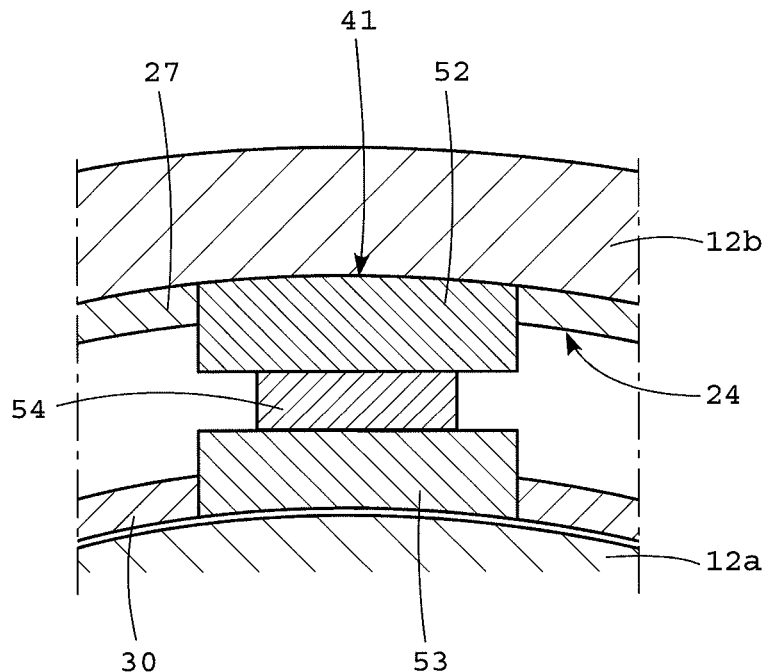
FIG. 10 is a schematic view of an electric power source section which makes use of electromotive force based on Seebeck effect.

The electric power source section 41 is provided by dry batteries, rechargeable batteries, or a self-contained power generator. As the self-contained power source the following options may be used. Specifically, the electric power source section 41 shown in FIG. 10 includes heat conductors 52, 53 which are provided to penetrate the outer circumferential surface 27 and the inner circumferential surface 30 of the casing 24 respectively; and a Seebeck element placed between these heat conductors 52, 53.

The electric power source section 41 may be provided by a power generating device which makes use of Seebeck effect as described above. In this arrangement, when the rolling bearing device 10 is operating, temperature of the inner ring 17 and the outer ring 18 increases due to friction heat with the rolling elements 19. In general configuration, the outer ring 18 is assembled into the housing 15 of the machine it serves, and therefore loses heat by thermal conduction, resulting in temperature difference between the inner and the outer rings 17, 18. Different temperatures conducted to the respective heat conductors 52, 53 causes the Seebeck element 54 to have temperature difference between its two end surfaces, causing the element to generate electric power based on Seebeck effect.

When using the above configuration where heat conductors 52, 53 are provided to penetrate the inner circumferential surface and the outer circumferential surface of the casing 24 respectively and a Seebeck element 54 is placed between these heat conductors 52, 53, it is preferable that an adhesive which takes heat conductivity well into account should be used on a surface where the heat conductor 52 which penetrates the outer circumferential surface of the casing 24 makes contact with the inner diameter surface of the outer ring-side spacer 12b. It should be noted here that the heat conductor 52 which is on the outer ring side has an outer diameter which is equal to an inner diameter of the outer ring-side spacer 12b and is fitted thereto for improved heat radiation. On the other hand, the heat conductor 53 which is on the inner ring side has its inner diameter surface not in contact with the inner ring-side spacer 12a. If possible, it is desirable that the outer ring-side and the inner ring-side heat conductors 52, 53 have the same volume.

Preferably, thermal grease, for example, should be applied between the inner diameter surface of the outer ring-side spacer 12b and the heat conductor 52; between the heat conductor 52 and the Seebeck element 54; and between the Seebeck element 54 and the inner-ring-side heat conductor 53, for improved contact and heat conductivity. Thermal grease generally contains silicone as a primary ingredient. The heat conductors 52, 53 should be made of a metal which has a high heat conductivity rate. For example, silver, copper, gold, etc. are good candidates, among which copper is the most common due to cost reasons. In addition, copper alloys which contain copper as a primary ingredient can also be used. Further, sintered bodies containing copper as a primary ingredient are also usable.

Figure 11:
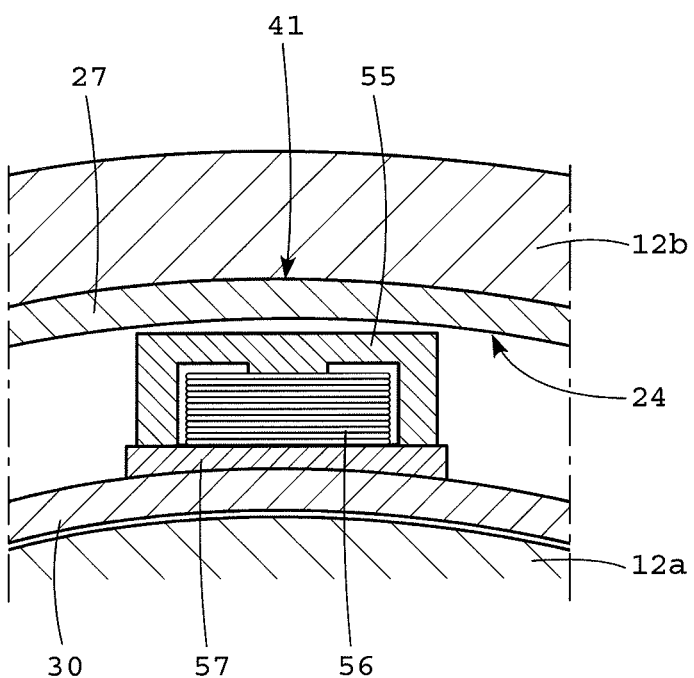
FIG. 11 is a schematic view of an electric power source section which makes use of electromotive force based on electromagnetic induction.
Figure 12:
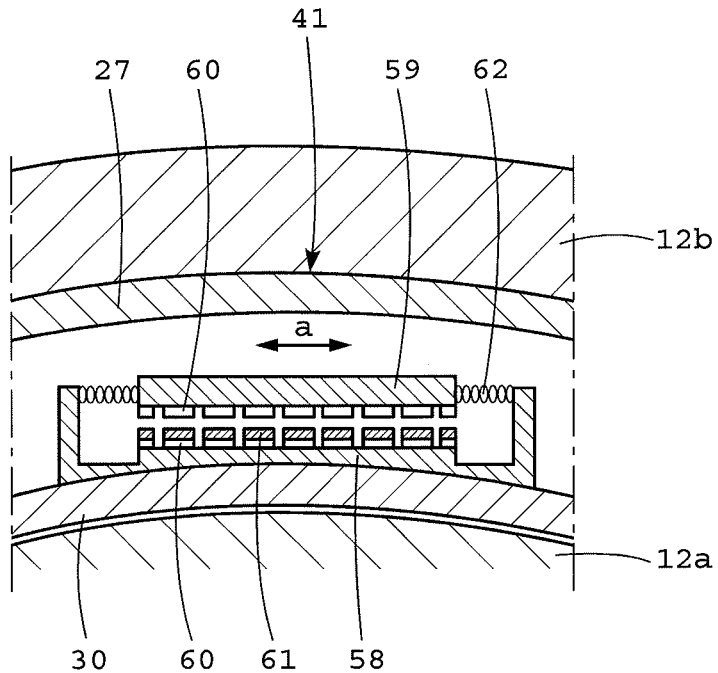
FIG. 12 is a schematic view of an electric power source section which makes use of electromotive force based on electrostatic induction.
Figure 13:
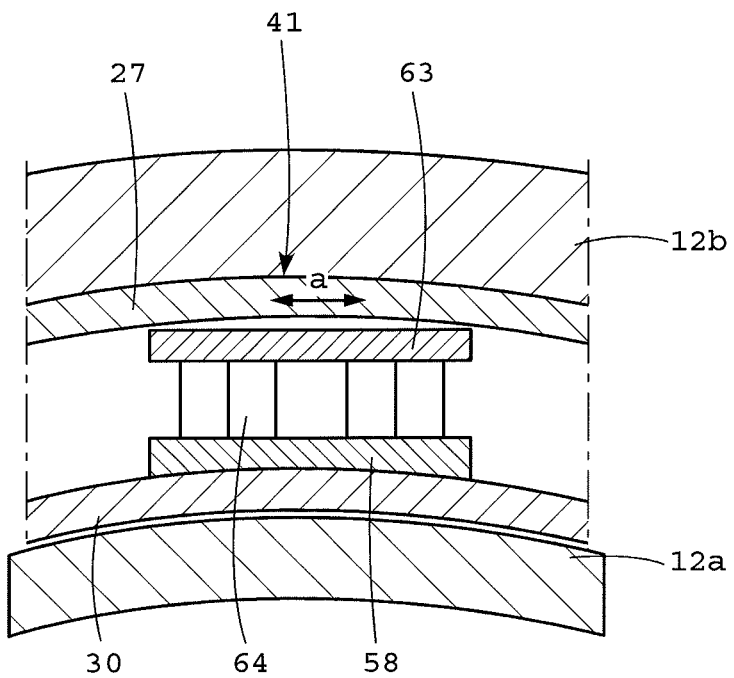
FIG. 13 is a schematic view of an electric power source section which makes use of electromotive force based on dielectric polarization.

In addition to those which generate electric power based on the Seebeck effect as described above, the electric power source section 41 can also be provided by those shown in FIG. 11, FIG. 12 and FIG. 13.

The one in FIG. 11 is applicable in cases where there is an alternating magnetic field inside the bearing device 10. There is leakage flux or high-frequency wave radiation inside a build-in spindle incorporated in machine tools for example, or near high-frequency wave equipment which handles a large amount of electric power. This leakage flux is utilized to generate electric power based on electromagnetic induction. Specifically, an E-shaped iron core 55 which has an open end on one side is combined with a coil 56 for efficient capture of the alternating magnetic field and power generation based on electromagnetic induction. An insulation base 57 is attached to the open surface of the iron core 55. If the leakage flux has a known frequency, then the iron core 55 may be eliminated while the coil 56 is configured to resonate with the frequency of the leakage flux.

The one shown in FIG. 12 is applicable in cases where there is vibration inside the rolling bearing device 10. When vibration occurs in the rolling bearing device 10, a rubbing device 62 causes a moving-side insulation substrate 59 to vibrate in a direction indicated by an arrow "a". In this process, relative movement between a fixed-side and the moving-side insulation substrates 58, 59 and an electret 61 generate electric charge between electrodes 60 based on electrostatic induction. This electric charge is taken out to obtain electric power.

The one shown in FIG. 13 is applicable also in cases where there is vibration inside the rolling bearing device 10. Specifically, an elastic sheet of piezoelectric body 64 is disposed between a fixed-side insulation substrate 58 and a weight 63. When vibration occurs in the rolling bearing device 10, interaction between the weight 63 and the piezoelectric body 64 causes the weight 63 to vibrate in a direction indicated by an arrow "a". In this process, the piezoelectric body 64 is twisted, to generate electromotive force based on dielectric polarization. This electromotive force is taken out to obtain electric power.

The electric charge generated by the power generation section 41 is stored in a power storage section such as a battery and a capacitor. If a capacitor is employed, an electric double layer condenser (capacitor) is desirably used.

One bearing device 10 according to one embodiment was covered with reference to FIG. 1 through FIG. 4 while the other according to another embodiment was covered with reference to FIG. 5 through FIG. 8 thus far. Both of them have their tanks 39 of their respective oil supply units 13 filled with lubrication oil A and the lid 25 closed before use.

As the rotation shaft 14 rotates, the sensors such as the bearing temperature sensor 46, the bearing rotation sensor 47, the lubricant remaining quantity sensor 48, the lubricant temperature sensor 49 pick up and send signals to a CPU 51. Based on these signals, the CPU 51 provides automatic control on opening degree and time of the open/close valve 37, thereby optimizing lubrication. The lubrication oil A is provided by lubrication oil or low-viscosity grease.

In the embodiment shown in FIG. 5 through FIG. 8, the filter 45 which allows air to pass through keeps an atmospheric air pressure inside the tank 39. Therefore, the lubrication oil A flows due to a weight of the lubricant itself through the nozzle 38 and then out of the tip, i.e., the discharge spout 38a. The discharged lubricant moves along the inner diameter surface 33 of the guide 28 and is supplied to the track groove 35 (see FIG. 6). The pressure for discharging the lubrication oil A is obtained only from the weight of the lubrication oil A in the tank 39.

Figure 14:
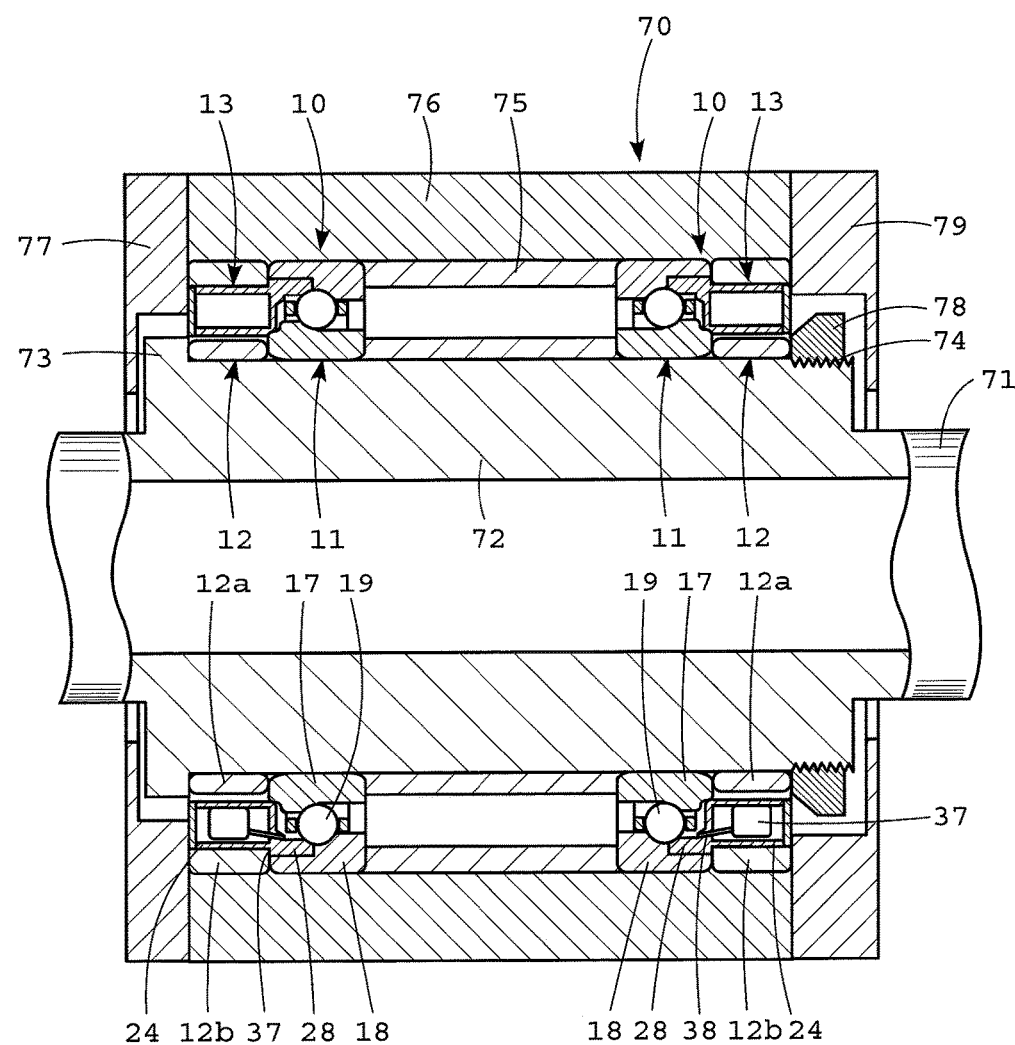
FIG. 14 is a partially unillustrated sectional view of a spindle which makes use of the embodiment in FIG. 5.

FIG. 14 shows a spindle 70 in a machine tool, for example, which utilizes the bearing devices 10 according to the embodiment shown in FIG. 5 through FIG. 8. The spindle 70 has its rotation shaft 71 placed horizontally.

The rotation shaft 71 has an intermediate region formed with a large diameter section 72, which has an outer diameter surface with an axial end formed with a flange 73, and another axial end formed with a thread 74. Between the flange 73 and the thread 74, two bearing devices 10 are installed to sandwich a middle spacer 75 in between.

One of the bearing devices 10 is positioned at a location on an inner side of the flange 73 and of another flange 77 which faces radially thereto at an end of the spindle housing 76. The other bearing device 10 is positioned at a location on an inner side of a nut 78 which is threaded around the thread 74 and of a flange 79 which faces thereto on another end of the spindle housing 76.

The bearing device 10 on the flange 73 side and the bearing device 10 on the thread 74 side are disposed symmetrically with each other, with the rolling bearing 11 being disposed on the middle spacer 75 side (inner side) and the spacer 12 being disposed on the outer side.

As the rotation shaft 71 rotates, lubrication oil A is supplied due to a weight of the lubricant itself, from the discharge spout 38a of the nozzle 38 to the track groove 35 of the rolling bearing 11 in the same manner in the two bearing devices 10.

Figure 15:
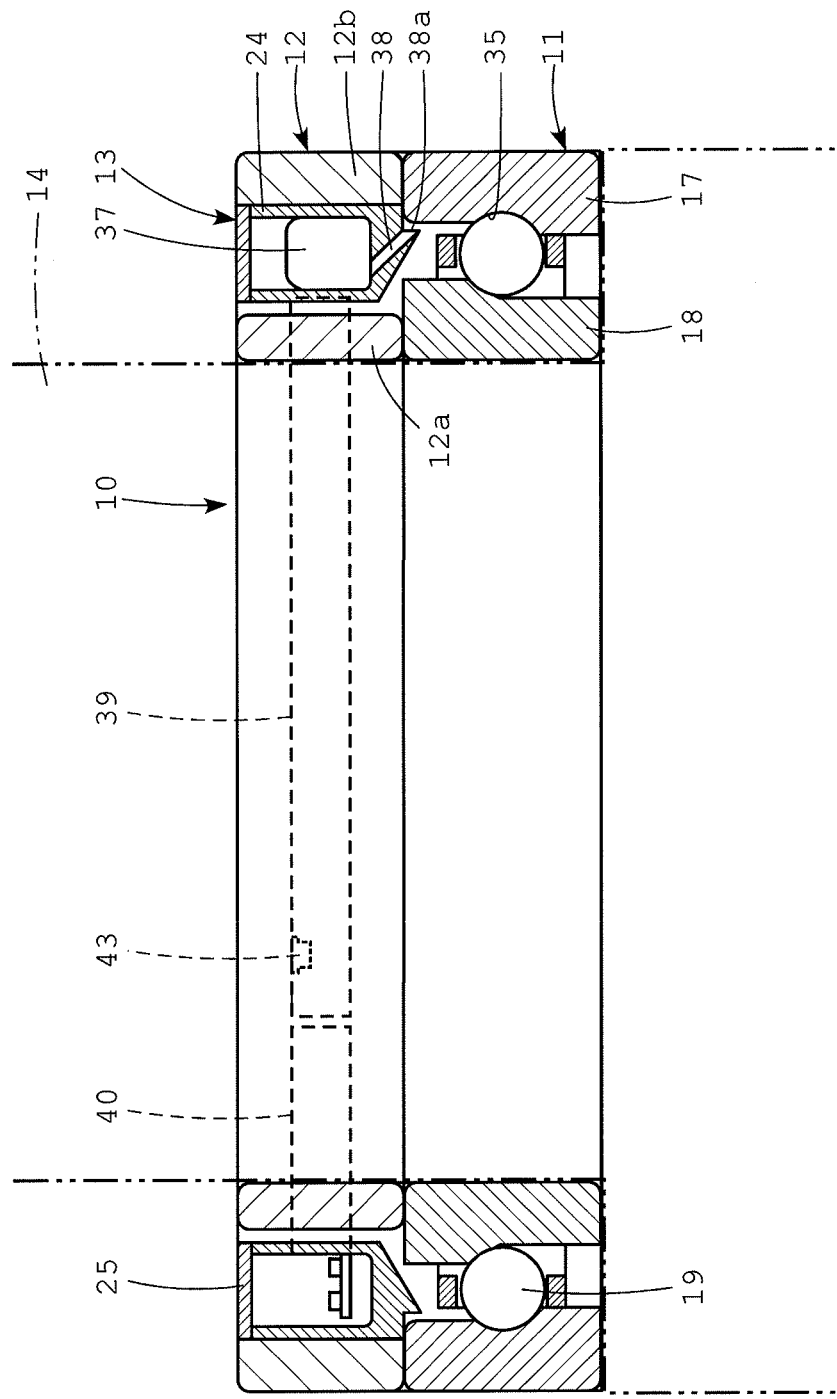
FIG. 15 is a sectional view of a variation of the bearing device shown as the embodiment in FIG. 5.

The bearing device 10 shown in FIG. 15 is a horizontal type attached to a rotation shaft 14 which is disposed vertically. Basic arrangement is the same as the upright type except that there is a 90-degree orientation change.

In this case, in the embodiment according to FIG. 5 through FIG. 8, the tank 39 is in a horizontal attitude. Therefore, the nozzle 38 of the open/close valve 37 is provided on a bottom surface of the open/close valve 37 so that it is at the same or a lower height than the bottom surface of the tank 39, in order that lubrication oil will discharge from the tank 39 due to a weight of the lubricant. Also, the spacer 12, which includes the oil supply unit 13, is disposed at a higher level while the rolling bearing 11 is disposed at a lower level so that the discharged lubrication oil will drop onto a predetermined spot in the rolling bearing 11. The stop plug 43 of the tank 39 is provided in an upper end wall surface of the tank 39.

Since the lubrication oil discharged from the discharge spout 38a of the nozzle 38 is reliably supplied by its weight to inside of the rolling bearing 11 located beneath, there is no need for providing the guide 28 (see FIG. 15) which is in the embodiment in FIG. 14. Rather, it is enough if the discharge spout 38a is at an upper region of the gap between the inner ring 17 and the outer ring 18 of the rolling bearing.

Figure 16:
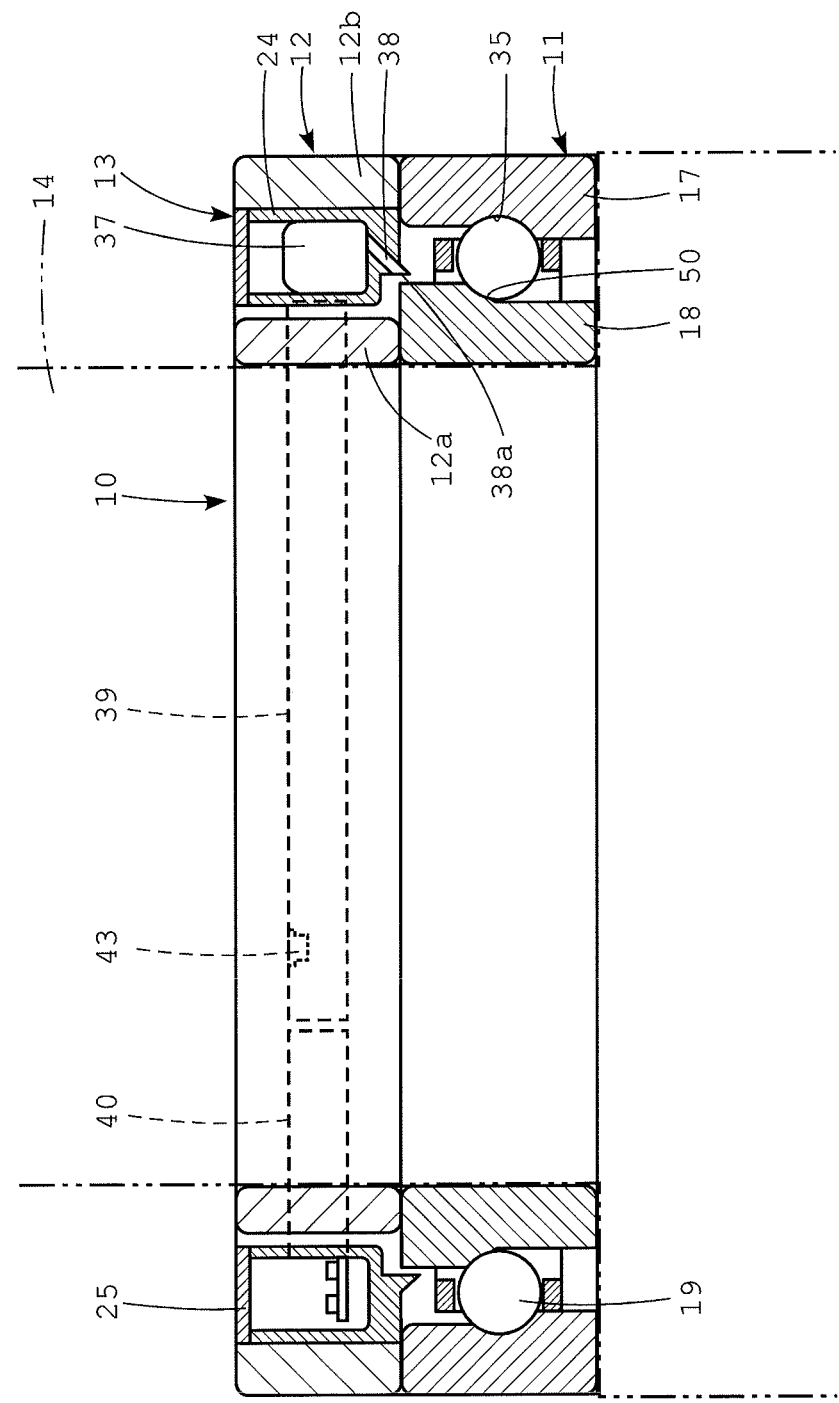
FIG. 16 is a sectional view of a variation of the bearing device shown as the embodiment in FIG. 5.

In the embodiment in FIG. 15, the nozzle 38 is slanted outward in order to supply lubricant to the track groove 35 in the outer ring 17 of the rolling bearing 11. In cases where lubricant should be supplied to the track groove 50 of the inner ring 18, inward slanting will be used as shown in FIG. 16.

Figure 17:
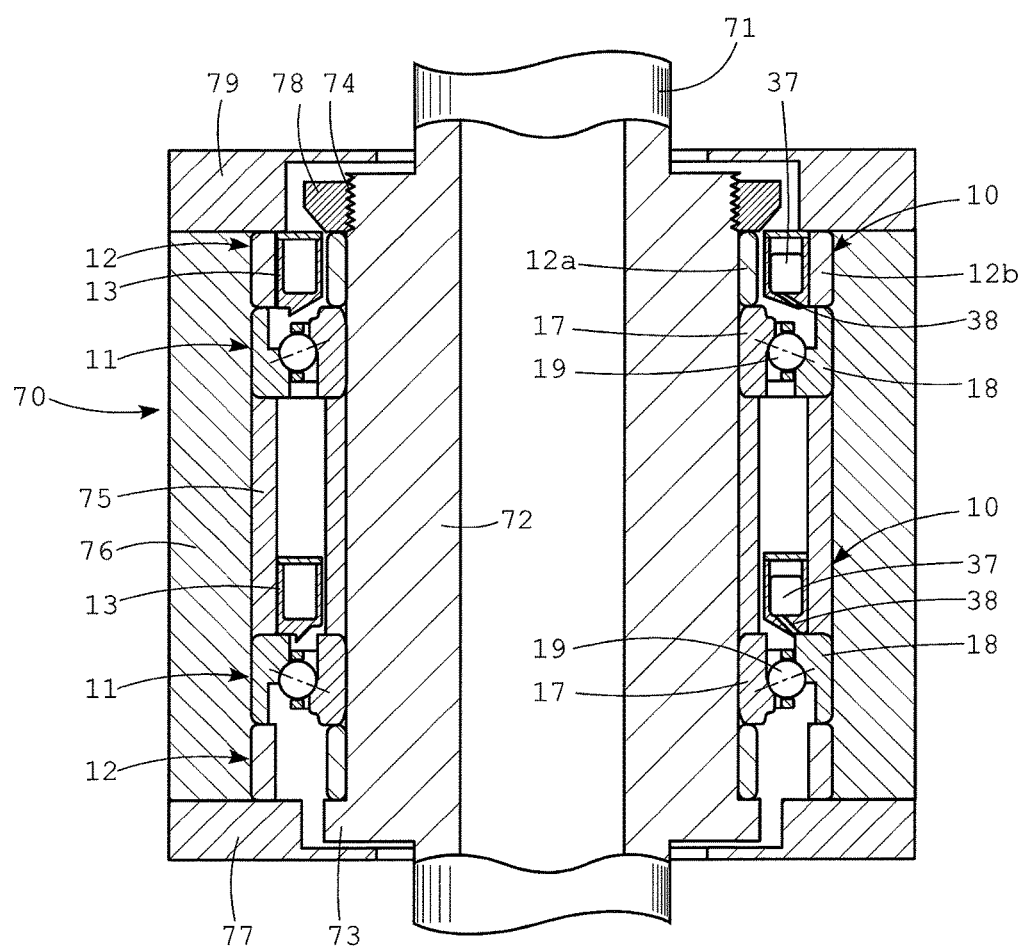
FIG. 17 is a partially unillustrated sectional view of a variation of the spindle shown in the embodiment in FIG. 5.
Figure 18:
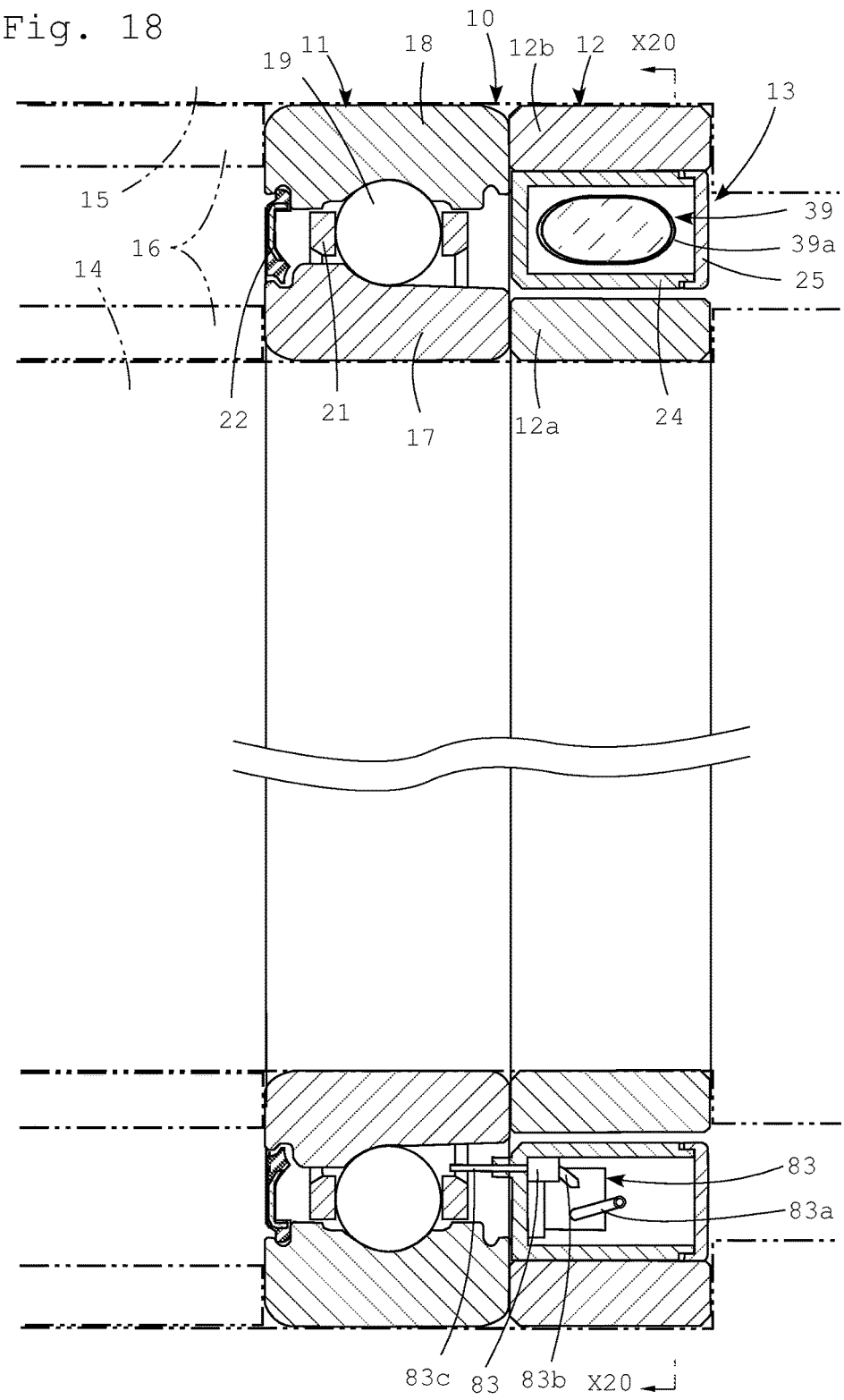
FIG. 18 is a sectional view showing an embodiment of a bearing device as a solution to the second object of the present invention.

FIG. 17 shows an embodiment in which a spindle 70 has its rotation shaft 71 disposed vertically. The bearing device 10 is disposed at two locations, i.e., an upper location and a lower location. In the upper bearing device 10, the spacer 12 is at an upper position while the rolling bearing 11 is at a lower position. In the lower bearing device 10, the oil supply unit 13 is assembled to the middle spacer 75, and the rolling bearing 11 is therebelow. The spacer 12 at the lowest end is hollow.

[Embodiment 2]

Next, a rolling bearing device 10 embodies a solution to the second object of the present invention; namely, this bearing device does not require a special, fixed-side track ring 18, nor a special, rotation-side track ring 17 of special width and shape, and does not require removal of the rolling bearing when replenishing the lubrication oil tank 39 with lubrication oil. Description of the rolling bearing device 10 will be made with reference to FIG. 18 through FIG. 24. The rolling bearing 11 is pre-packed with desirable grease, and a seal plate 22 is attached to an end on the spacer 16 side.

Figure 20:
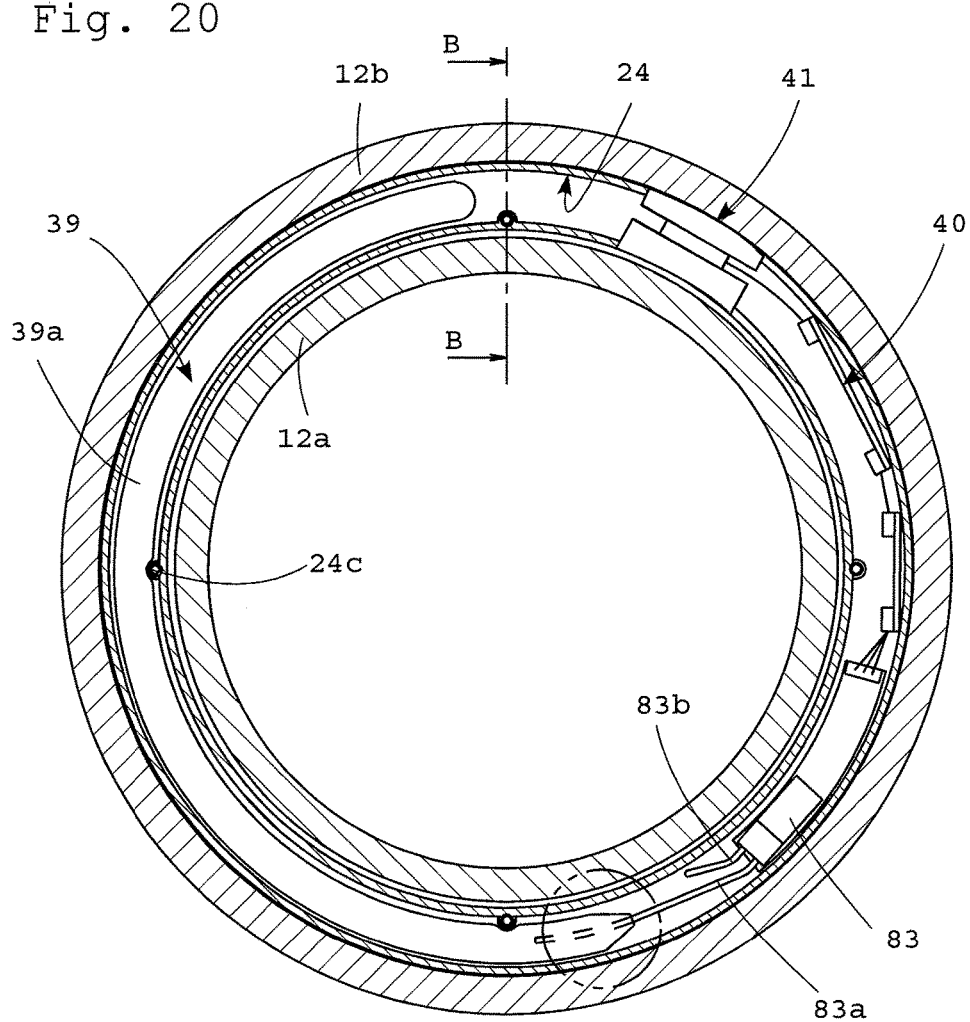
FIG. 20 is a sectional view taken in line X20-X20 in FIG. 18.

As shown in FIG. 20, the oil supply unit 13 includes an annular casing 24, which incorporates therein such components as an electric power source section 41, a driving section 40, a pump 83, a lubrication oil tank 39, etc. in a circumferential direction.

The casing 24 has a lid 25, which is fixed to the casing 24 with a screw 24a. By removing the screw 24a and removing the lid 25, it becomes possible to replenish the lubrication oil tank 39, which is incorporated inside the casing 24, with lubrication oil without removing the entire oil supply unit 13.

Figure 19:
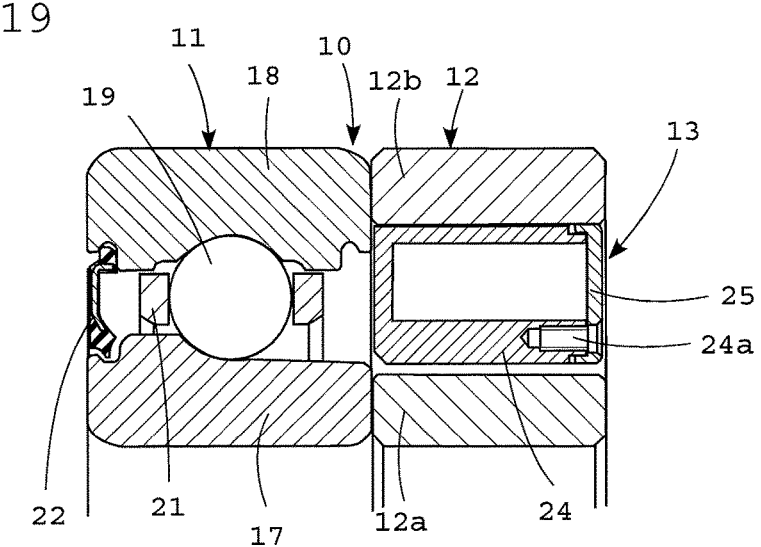
FIG. 19 is a sectional view taken in line B-B in FIG. 20.

As shown in FIG. 19, the annular casing 24 of the oil supply unit 13 has a generally U-Shaped section, with an open surface facing away from the rolling bearing 11. This opening in the casing 24 is closed with the lid 25 which is detachable therefrom/attachable thereto. The casing 24 and the lid 25 are made of the same thermally plastic resin material such as PPS.

The casing 24 has its outer circumferential surface adhesively fixed to the inner diameter surface of the outer ring-side spacer 12b, with an adhesive. The adhesive for fixing the casing 24 is provided by epoxy resin for example.

Figure 21:
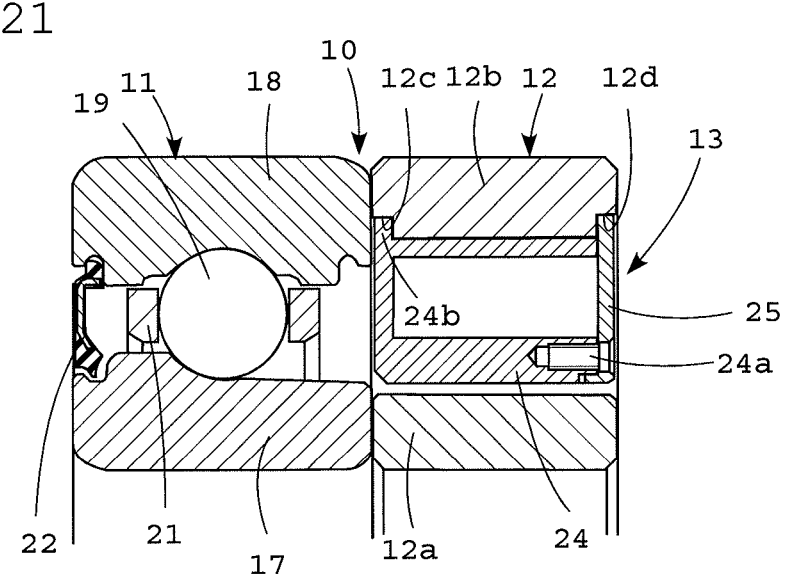
FIG. 21 is a sectional view of another embodiment, viewed from lines B-B in FIG. 20.

FIG. 21 shows an embodiment in which the casing 24 is fixed without using an adhesive, to the inner diameter surface of the outer ring-side spacer 12b.

In this example in FIG. 21, a pair of recesses 12c, 12d receding in an outer diameter direction are formed on both axial sides of an inner diameter surface of the outer ring-side spacer 12b; the casing 24 has an outer diameter surface on the rolling bearing 11 side, where there is formed a ridge 24b to fit into the recess 12c, and this ridge 24b is fitted into the recess 12c; the other recess 12d is fitted by an outer diameter portion of the lid 25 which is fixed to the casing 24 with the screw 24a, so that the lid 25 is screw-fixed to the casing 24 by the screw 24a. Thus, the inner diameter surface of the outer ring-side spacer 12b is sandwiched by the ridge 24b of the casing 24 and the outer diameter portion of the lid 25, thereby fixing the casing 24 to the inner diameter surface of the outer ring-side spacer 12b, without using an adhesive.

Next, a lubrication oil tank 39 is incorporated inside the casing 24, is provided by a bag 39a of an elastic resin and is disposed in an arcuate form along the annular casing 24.

Figure 22:
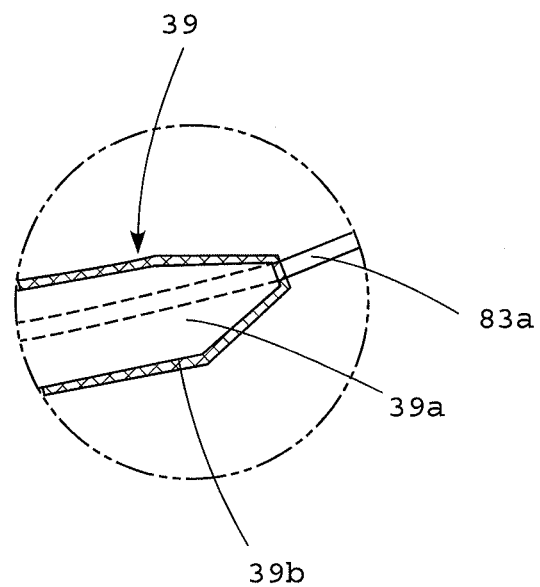
FIG. 22 is an enlarged view of a bag which is shown circled by an alternate long and two short dashes line in FIG. 20.

As shown in an enlarged view in FIG. 22, the plastic bag 39a is, for example, made of a resin film, by placing a sheet of the resin film on another, and then thermally welding their perimeters. In FIG. 22, a reference symbol 39b indicates the thermally welded region.

The bag 39a is provided with a suction tube 83a which leads to the pump 83. The suction tube 83a is integrated with the bag 39a by sandwiching the tube between two films of resin when forming the bag 39a, and then performing the thermal welding to complete the bag 39a.

Figure 23:
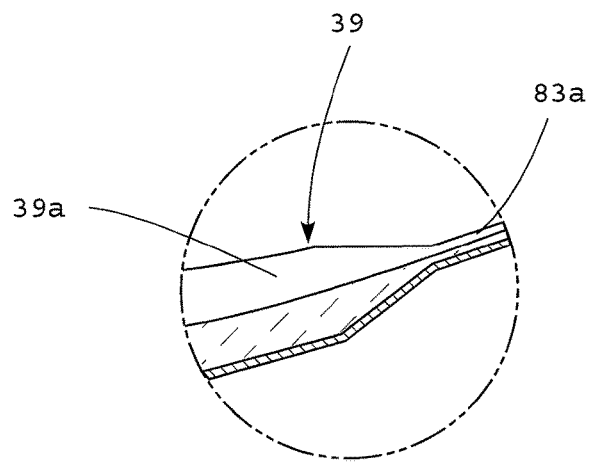
FIG. 23 is an enlarged view of a bag according to another embodiment of the one shown circled by an alternate long and two short dashes line in FIG. 20.

FIG. 23 shows a bag 39a which is formed by blow molding. If the bag 39a is formed by blow molding, it is possible to form the suction tube 83a and the bag 39a integrally with each other.

Desirably, however, the bag 39a of the lubrication oil tank 39 formed by blow molding should receive a flattening process to modify a bag portion since the bag portion is bulged in the blow molding process. By altering the shape of the bag into a flattened bag, the bag becomes possible to discharge lubrication oil completely even after the amount of the lubrication oil has become small. This way, it is possible to completely consume the lubrication oil stored in the bag 39a.

The bag 39a which constitutes the lubrication oil tank 39 can be formed of such a material as polyamide (for example, polyamide 11 and polyamide 12), fluorine-containing rubber (FKM), polyamide elastomer, polyethylene, polyester and polypropylene; however, there is no specific limitation to the material as far as the material is compatible with lubrication oil stored in the bag 39a.

It is desirable that the suction tube 83a which is provided in the bag 39a of the lubrication oil tank 39 is detachable from the pump 83. The suction tube 83a which is detachable from the pump 83 allows the suction tube 83a to be removed from the pump 83 for replenishing lubrication oil A from the suction tube 83a into the bag 39a when lubrication oil level becomes low in the lubrication oil tank 39.

Also, the bag 39a which is detachable from the pump 83 allows such a replacement system that lubrication oil A is loaded in a replacement bag 39a, and when there is no more lubrication oil A left in the original bag 39a, then the used bag 39a is taken out and is replaced with the replacement bag 39a. In this way, replenishing lubrication oil A can be finished within a short time. Since the replacement bag 39a can be loaded with lubrication oil under a controlled environment at a lubrication oil manufacturer, it is possible to reduce such a risk as foreign matter inclusion in the bag 39a at the time of loading oil. It should be noted here that a lid should desirably be placed to the suction tube 83a of the replacement bag 39a in order to prevent foreign matter inclusion during storage.

Lubrication oil A which is loaded in the bag 39a of the lubrication oil tank 39 desirably has a viscosity of VG22 for example, since an excessively high viscosity will be a too much burden on the pump and the power source.

Figure 24:
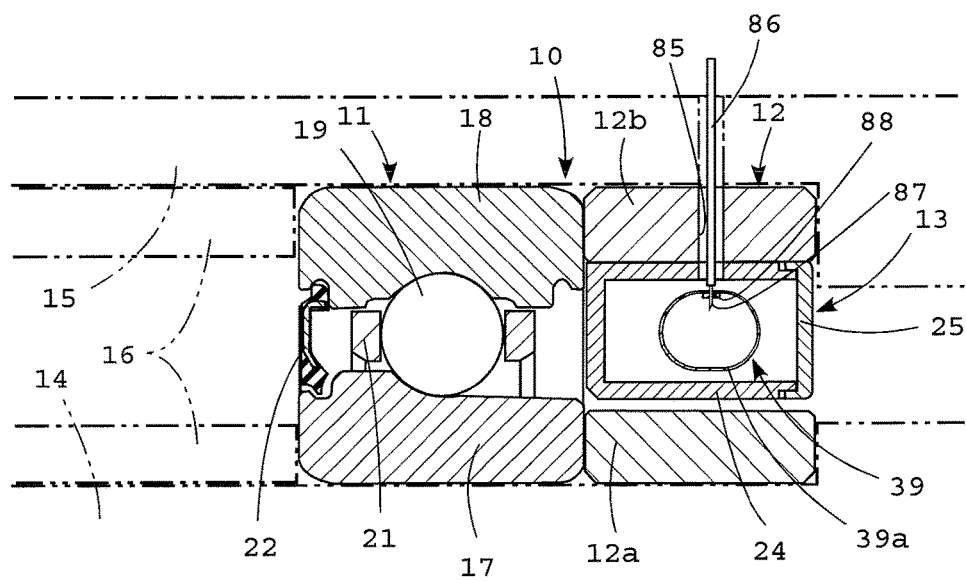
FIG. 24 is a fragmentary sectional view showing another embodiment of a bearing device as a solution to the second object of the present invention.

Next, FIG. 24 shows another embodiment. In this embodiment, there is no need for removing the bag 39a out of the casing 24 or removing the lid 25 when replenishing the bag 39a of the lubrication oil tank 39 with lubrication oil A, i.e., it is possible to fill the bag 39a with lubrication oil A while the bag 39a stays inside the casing 24.

As shown in FIG. 24, a through-hole 85 is made radially, from an outer circumferential surface of the housing 15 in which the rolling bearing device 10 is installed, to inside of the casing 24 in the oil supply unit 13. When replenishing lubrication oil A, a lubrication oil syringing needle 86 is inserted through the through-hole 85 into the bag 39a inside the casing 24, to fill the bag 39a with the lubrication oil A. A lubrication oil injection port 88 which is made of a highly elastic rubber is provided at a place in the bag 39a where the lubrication oil syringing needle 85 will be inserted so that insertion/removal of a needle tip 87 of the lubrication oil syringing needle 86 will not cause leakage of lubrication oil.

The housing 15 in which the rolling bearing device 10 is installed, the spacer 12, the radial through-hole made in the casing 24 of the oil supply unit 13, and the lubrication oil injection port 87 in the bag 39a are circumferentially aligned with each other at the time of assembling.

In the embodiment described above, the annular casing 24 incorporates, in addition to the lubrication oil tank 39, an electric power source section 41, an driving section 40, an pump 83, etc., in its circumferential direction.

The pump 83 has a suction tube 83a which sucks lubrication oil from the lubrication oil tank 39; and a discharge tube 83b from which the sucked lubrication oil is discharged. The discharge tube 83b has a discharge nozzle at its tip, from which lubrication oil is supplied to between the fixed-side track ring and the rotation-side track ring of the rolling bearing 11.

It is possible, for example, to operate the pump 83 upon a timing when the electric power, which comes from the electric power source section 41 and is stored in a capacitor in the power storage section, has reached a predetermined voltage. If the power is charged too quickly in relation to power generation efficiency, the power may be discharged to a resistor for example, upon a time when a predetermined power storage voltage has been reached thereby introducing an interval in the operation timing of the pump 83. In this case, there is a cycle (s) of charging and discharging before the pump 83 is operated. The number of this charge-discharge cycles can be used in controlling the operation interval of the pump 83. Alternatively, a timer function may be triggered when the power storage voltage has reached a predetermined value, to provide an interval in the operation timing of the pump 83. In this case, the above-described charge-discharge cycle is not repeated.

Figure 25:
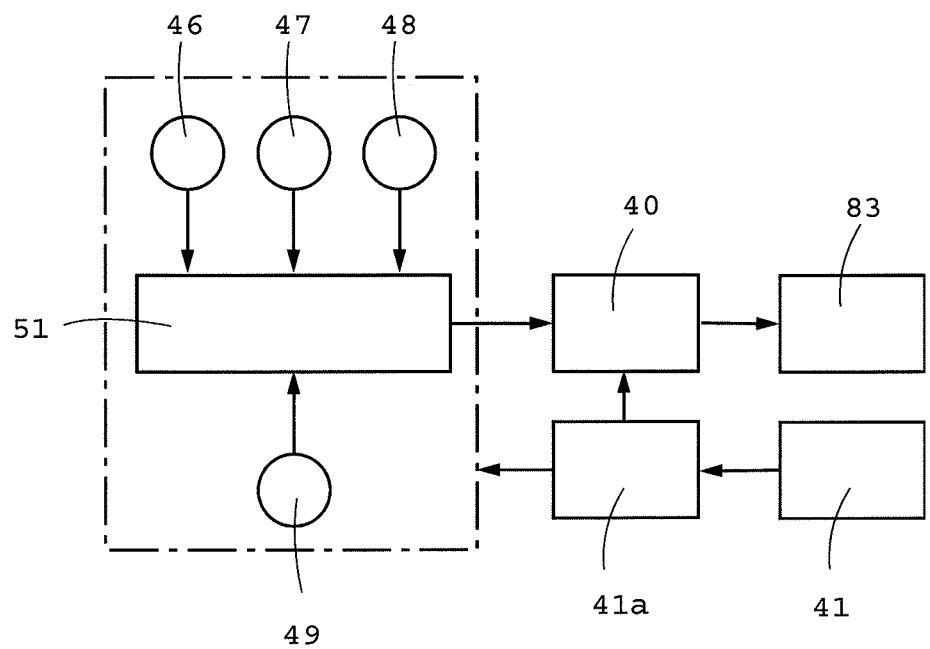
FIG. 25 is a control schematic of the electric power source section.
Figure 26:
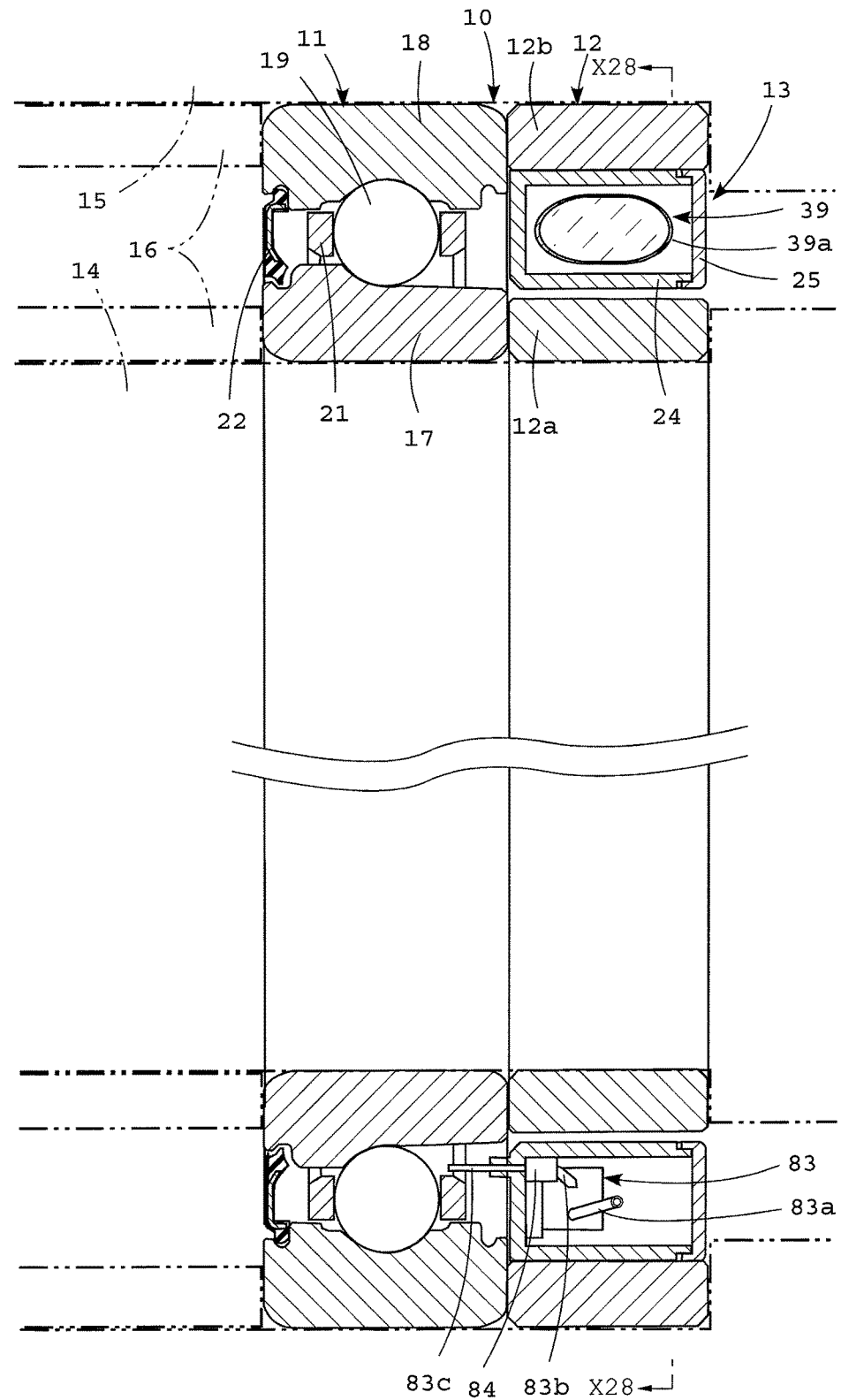
FIG. 26 is a fragmentary sectional view showing an embodiment of a bearing device as a solution to the third object of the present invention.
Figure 27:
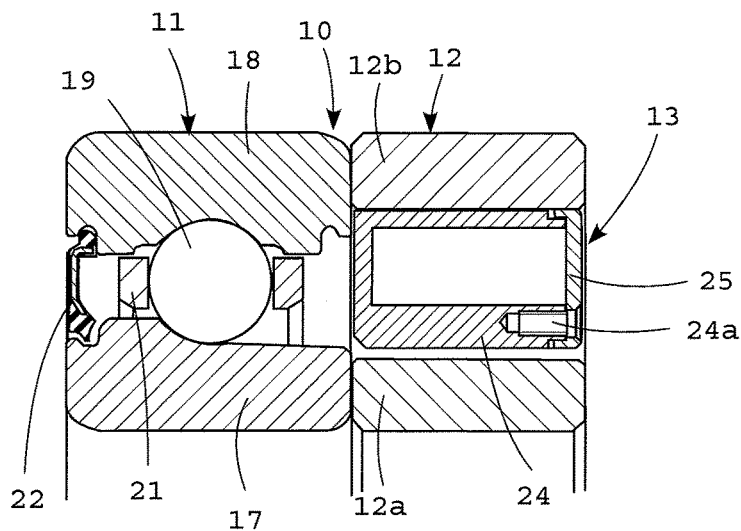
FIG. 27 is a sectional view taken in line B-B in FIG. 28.

As shown in FIG. 25, for example, the driving section 40 has sensors such as a bearing temperature sensor 46, a bearing rotation sensor 47, a lubricant remaining quantity sensor 48, and a lubricant temperature sensor 49. Signals from these sensors are inputted to a CPU 51, which then automatically controls the pump 43 in accordance with temperature and rotation status of the rolling bearing 11, thereby controlling the amount of lubricant supply. In FIG. 25, a reference symbol 41a indicates a power storage section.

The suction tube 83a, which is connected to the suction side of the pump 83, extends into the lubrication oil tank 39 to suck lubrication oil stored in the lubrication oil tank 39.

On the other hand, the discharge tube 83b which is connected to the discharge side has its tip connected to a discharge nozzle for discharging lubrication oil into the rolling bearing. It is desirable that the discharge nozzle has its tip disposed at a location between the inner and the outer rings of the bearing, closely to the inner ring's outer circumferential surface. The discharge nozzle's nozzle hole has an appropriately designed inner diameter based on a relationship between surface tension due to base oil viscosity and the amount of discharge.

It should be noted here that the above embodiment is an example of inner ring rotation, and. Also, it has a horizontal rotation axis; however, the axis may be vertical. Further, it may be incorporated in a machine tool spindle.

[Embodiment 3]

Next, a rolling bearing device as a solution to the third object of the present invention will be described; namely, this embodiment is capable of eliminating the problem that when the pump 83 is stopped after completion of lubrication oil supply, the pump 83 and discharge piping are filled with lubrication oil A, and there is siphoning of lubrication oil A into the discharge piping, causing leakage of the lubrication oil A from the nozzle end, resulting in oversupply of lubrication oil. The description will be made with reference to FIG. 26 through FIG. 32.

First, the lubrication oil tank 39 which is incorporated inside the casing 24 is provided by a bag 39a of an elastic resin, and is disposed in an arcuate form along the annular casing 24.

The bag 39a has a suction tube 83a which leads to the pump 83. The suction tube 83a can be integrated with the bag 39a by sandwiching the tube between two films of resin when forming the bag 39a and then performing thermal welding to complete the bag 39a.

Also, if the bag 39a is formed by blow molding, it is possible to form the suction tube 83a and the bag 39a integrally with each other.

The bag 39a which constitutes the lubrication oil tank 39 can be formed of such a material as nylon, polyethylene, polyester and polypropylene; however there is no specific limitation to the material as far as the material is compatible with lubrication oil stored in the bag 39a.

Lubrication oil which is loaded in the lubrication oil tank 39 desirably has a viscosity of VG22 for example, since an excessively high viscosity will bear a too much burden on the pump and the power source.

The pump 83 has a suction tube 83a which sucks lubrication oil A from the lubrication oil tank 39; and a discharge tube 83b from which the sucked lubrication oil is discharged. The discharge tube 83b has a discharge nozzle 83c at its tip, from which lubrication oil is supplied to between the fixed-side track ring and the rotation-side track ring of the rolling bearing 11.

The pump 83 is driven to suck lubrication oil A from the lubrication oil tank 39; and the lubrication oil is supplied to between the fixed-side track ring and the rotation-side track ring of the rolling bearing 11 from the discharge nozzle 83c at the tip of the discharge tube 83b. After a predetermined amount of the lubrication oil is supplied, the pump 83 is stopped.

Even when the pump 83 is stopped, the pump 83 and discharge piping are filled with lubrication oil, and there can be siphoning of lubrication oil from the lubrication oil tank 39, causing lubrication oil leakage from the discharge nozzle 83c. The present invention has a leakage prevention mechanism in the discharge piping of the pump 83 to prevent the leakage of lubrication oil.

Figure 28:
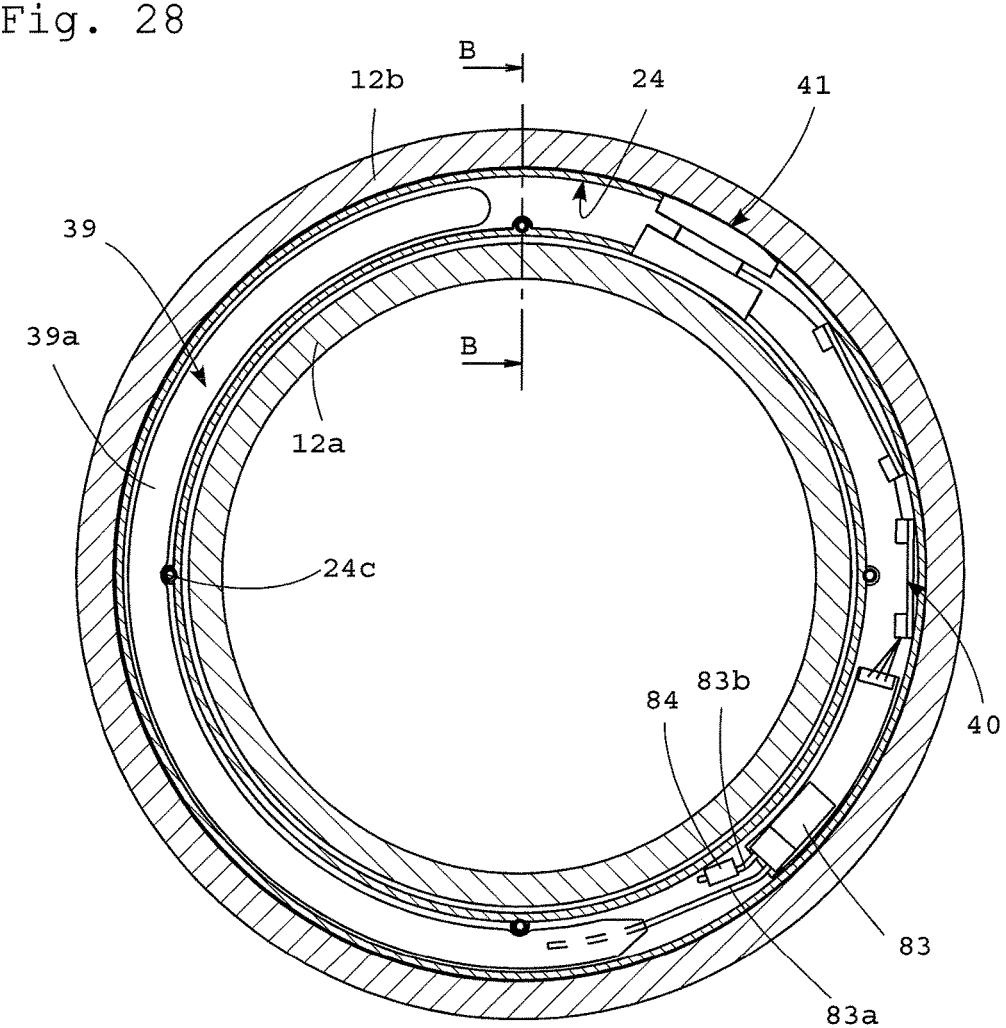
FIG. 28 is a sectional view taken in line X28-X28 in FIG. 26.

Examples of the leakage prevention mechanism includes, as shown in FIG. 28, an open/close valve 84 provided in the discharge tube 83b so that the open/close valve 84 will be opened only while the pump 83 is in operation and the open/close valve 84 will otherwise be closed. Another example is an arrangement that upon completion of oil supply by operating the pump 83, the pump 83 is operated in reverse thereby introducing air into the discharge piping.

Examples of the open/close valve 84 include a sequence valve 84a which operates mechanically to open the flow path upon exceeding a predetermined pressure; and a solenoid valve 84b which electrically opens/closes the flow path.

Figure 29:
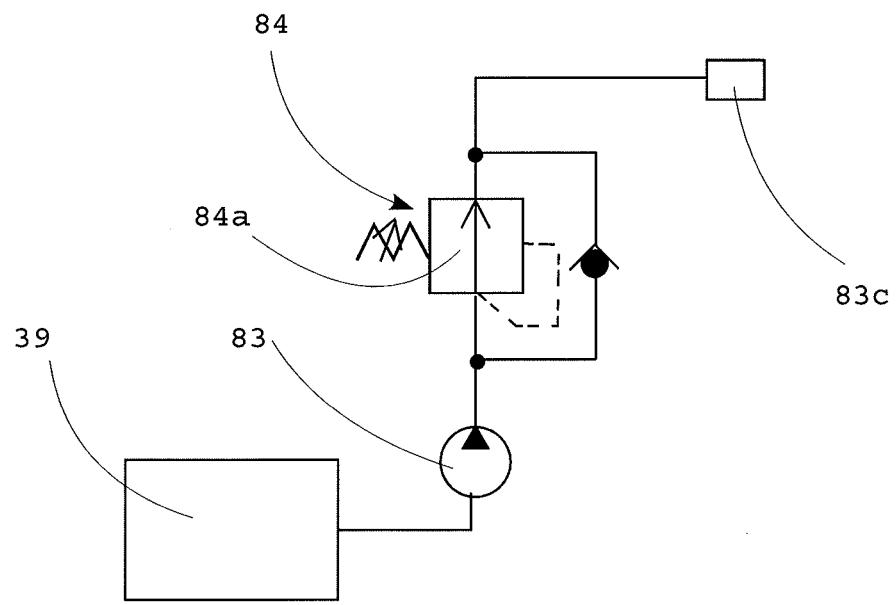
FIG. 29 is a schematic diagram of a hydraulic circuit which makes use of a sequence valve as a leakage prevention mechanism.
Figure 30:
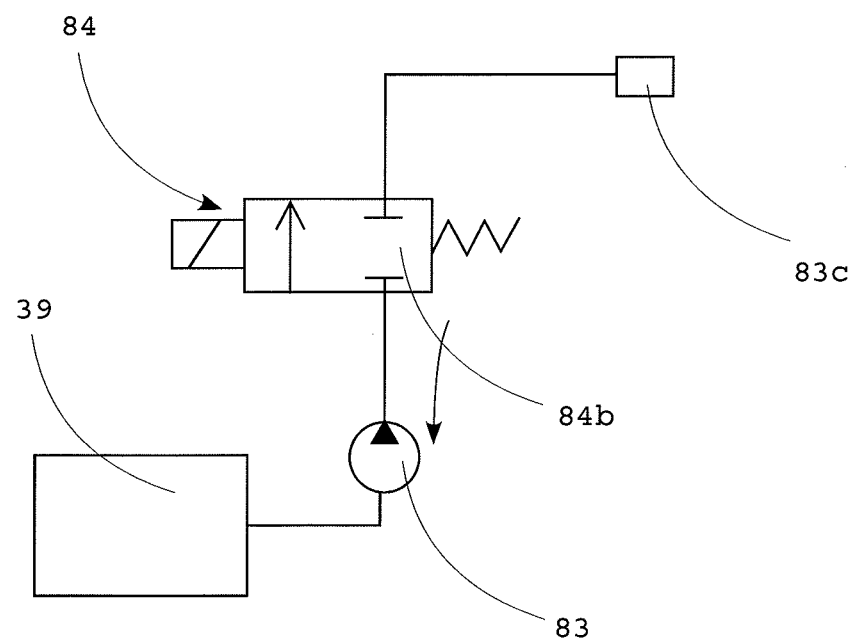
FIG. 30 is a schematic diagram of a hydraulic circuit which makes use of a solenoid valve as a leakage prevention mechanism.

FIG. 29 shows a hydraulic circuit for a case where the open/close valve 84 is provided by the sequence valve 84a. FIG. 30 shows a hydraulic circuit for a case where the open/close valve 84 is provided by the solenoid valve 84b.

The solenoid valve 84b and the pump 83 can be controlled in an integrated manner.

Figure 31:
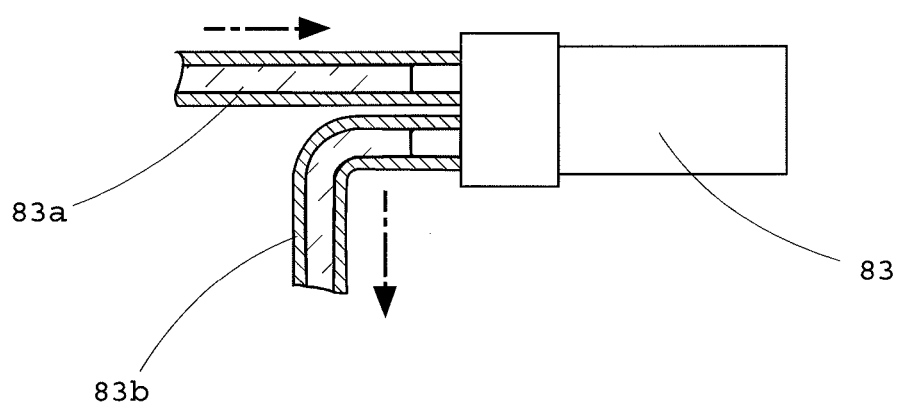
FIG. 31 is a schematic view which shows a flow of lubrication oil caused by siphoning after a pump is stopped.
Figure 32:
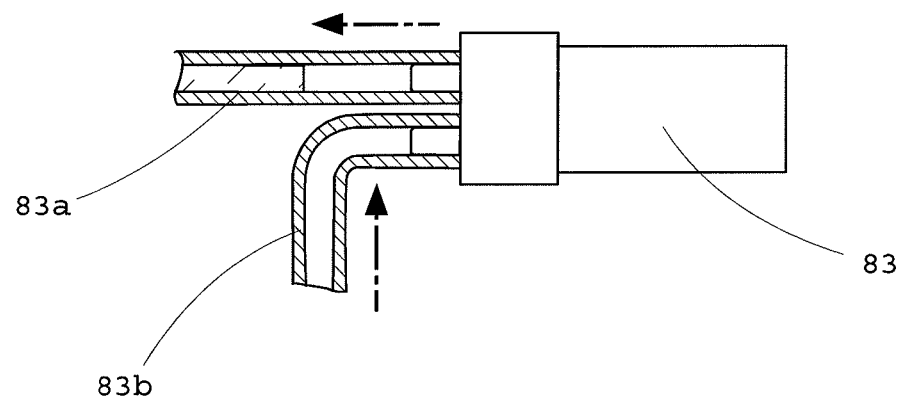
FIG. 32 is a schematic view which shows a flow of lubrication oil created by reverse operation of a pump after the pump is stopped.

When the pump 83 is stopped after the pump 83 was operated to perform an oil supply, the suction tube 83a and the pump 83 are still filled with lubrication oil, and as indicated by an arrow in alternate long and short dash lines in FIG. 31, there is siphoning of lubrication oil from the lubrication oil tank 39, into the discharge tube 83b, resulting in lubrication oil leakage from the discharge nozzle 83c. In order to prevent this leakage, in the present invention, the pump 83 is reverse operated after discharging lubrication oil. As the pump 83 is reversed and air is introduced into the discharge tube 83b and the pump 83 as indicated by an arrow in an alternate long and short dash lines in FIG. 32, lubrication oil comes under an increased pipe resistance, which prevents leakage caused by siphoning.

Next, timing when lubrication oil is supplied, i.e., timing when the pump 83 is operated, can be when the electric power, which is stored in a capacitor in a power storage section 41a, has reached a predetermined voltage. If power charge time is too short in relation to power generation efficiency, the power may be discharged to a resistor for example, upon a time when predetermined power storage voltage has been reached, thereby introducing an interval in the operation timing of the pump 83. In this case, there is a cycle(s) of charging and discharging before the pump 83 is operated. The number of this charge-discharge cycles can be used in controlling the operation interval of the pump 83. Alternatively, a timer function may be triggered when the power storage voltage has reached a predetermined value, to provide an interval in the operation timing of the pump 83. In this case, the above-described charge-discharge cycle is not repeated.

The suction tube 83a, which is connected to the suction side of the pump 83, extends into the lubrication oil tank 39 to suck lubrication oil stored in the lubrication oil tank 39.

On the other hand, the discharge tube 83b which is connected to the discharge side has its tip connected to a discharge nozzle 83c for discharging lubrication oil into the rolling bearing. It is desirable that the discharge nozzle 83c has its tip disposed at a location between the inner and the outer rings of the bearing, closely to the inner ring's outer circumferential surface. The discharge nozzle 83c has a nozzle hole appropriately designed inner diameter based on a relationship between surface tension due to base oil viscosity and the amount of discharge.

REFERENCE SIGNS LIST 10 bearing device
11 rolling bearing
12 spacer
12a inner ring-side spacer
12b outer ring-side spacer
13 oil supply unit
14 rotation shaft
15 housing
16 spacer
17 inner ring
18 outer ring
19 rolling element
21 retainer
24 casing
25 lid
26 inner end surface
27 outer circumferential surface
28 guide
29 stepped portion
30 inner circumferential surface
31 partial track groove
32 tip surface
33 inner diameter surface
35 track groove
36 discharge hole
37 open/close valve
38 nozzle
38a discharge spout
39 tank
39a bag
40 driving section
41 electric power source section
41a power storage section
42 connection pipe
43 stop plug
44 air vent
45 filter
46 bearing temperature sensor
47 bearing rotation sensor
48 lubricant remaining quantity sensor
49 lubricant temperature sensor
50 track groove
51 CPU
52, 53 heat conductor
54 Seebeck element
55 iron core
56 coil
57 insulation base
58 fixed-side insulation substrate
59 moving-side insulation substrate
60 electrode
61 electret
62 rubbing device
63 weight
64 piezoelectric body
65 the discharge amount adjuster
70 spindle
71 rotation shaft
72 large diameter section
73 flange
74 thread
75 middle spacer
76 spindle housing
77 flange
78 nut
79 flange
80 pressurizer
81 pressurizing seal plate
82 pressurizing spring
83 pump
83a suction tube
83b discharge tube
84 open/close valve
84a sequence valve
84b solenoid valve
85 through-hole
86 lubrication oil syringing needle
87 needle tip
88 lubrication oil injection port

The invention claimed is:

1. A bearing device comprising a rolling bearing and a lubricant supply device combined with each other,
    wherein the lubricant supply device is accommodated in a casing attached to a spacer which is a separate body from the rolling bearing and is adjacent to the rolling bearing, and the casing includes a casing body which has an opening on one end surface thereof, and a lid which is detachable from/attachable to the casing body so as to close the opening of the casing body, and
    wherein at least one ridge is formed on the casing, at least one recess is defined in the spacer, and the at least one ridge formed on the casing is configured to fit into the at least one recess defined in the spacer.

2. The bearing device according to claim 1, wherein the lubricant supply device includes a lubrication oil tank constituted by an elastic bag which is made of a resin film, by placing a first sheet of resin film on a second sheet of resin film and thermally welding perimeters of the first sheet of resin film and the second sheet of resin film.

3. The bearing device according to claim 1, wherein the casing is fixed to an inner diameter surface of the spacer.

4. A machine tool comprising the bearing device according to claim 1.

5. The bearing device according to claim 1, wherein the lid is fixed to the casing with a screw.

6. The bearing device according to claim 1, wherein the lubricant supply device includes a lubrication oil tank and a pump, and a suction tube between the lubrication oil tank and the pump.

7. The bearing device according to claim 6, wherein the suction tube is detachable from the pump.

8. The bearing device according to claim 1, wherein the lubricant supply device includes a pump provided with a discharge tube.

* * * * *